(12) United States Patent
Ganusov et al.

(10) Patent No.: US 12,164,462 B2
(45) Date of Patent: *Dec. 10, 2024

(54) MICRO-NETWORK-ON-CHIP AND MICROSECTOR INFRASTRUCTURE

(71) Applicant: Intel Corporation, Santa Clara, CA (US)

(72) Inventors: Ilya K. Ganusov, San Jose, CA (US); Ashish Gupta, San Jose, CA (US); Chee Hak Teh, Bayan Lepas (MY); Sean R. Atsatt, Santa Cruz, CA (US); Scott Jeremy Weber, Piedmont, CA (US); Parivallal Kannan, San Jose, CA (US); Aman Gupta, Austin, TX (US); Gary Brian Wallichs, San Jose, CA (US)

(73) Assignee: ALTERA CORPORATION, San Jose, CA (US)

( * ) Notice: Subject to any disclaimer, the term of this patent is extended or adjusted under 35 U.S.C. 154(b) by 840 days.

This patent is subject to a terminal disclaimer.

(21) Appl. No.: 17/132,663

(22) Filed: Dec. 23, 2020

(65) Prior Publication Data
US 2022/0197855 A1   Jun. 23, 2022

(51) Int. Cl.
*G06F 15/78* (2006.01)
*H04L 45/60* (2022.01)
*H04L 49/109* (2022.01)

(52) U.S. Cl.
CPC .......... *G06F 15/7825* (2013.01); *H04L 45/60* (2013.01); *H04L 49/109* (2013.01)

(58) Field of Classification Search
CPC .... H04L 49/109; H04L 45/60; G06F 15/7825
See application file for complete search history.

(56) References Cited

U.S. PATENT DOCUMENTS

| | | | |
|---|---|---|---|
| 10,673,440 B1* | 6/2020 | Camarota | G06F 7/483 |
| 11,119,929 B2* | 9/2021 | Barner | G06F 12/0813 |
| 2012/0198173 A1* | 8/2012 | Xu | G06F 12/0813 |
| | | | 711/E12.017 |
| 2016/0049941 A1* | 2/2016 | How | H03K 19/17728 |
| | | | 326/38 |
| 2019/0044515 A1* | 2/2019 | Gutala | H01L 23/3675 |
| 2019/0044519 A1* | 2/2019 | Atsatt | H03K 19/17772 |
| 2019/0129870 A1 | 5/2019 | Atsatt et al. | |
| 2019/0230049 A1* | 7/2019 | Clark | H04L 49/109 |
| 2021/0013885 A1* | 1/2021 | Atsatt | H03K 19/17728 |

* cited by examiner

*Primary Examiner* — Phong H Dang

(74) *Attorney, Agent, or Firm* — Fletcher Yoder, P.C.

(57) ABSTRACT

Systems and methods described herein may relate to data transactions involving a microsector architecture. Control circuitry may organize transactions to and from the microsector architecture to, for example, enable direct addressing transactions as well as batch transactions across multiple microsectors. A data path disposed between programmable logic circuitry of a column of microsectors and a column of row controllers may form a micro-network-on-chip used by a network-on-chip to interface with the programmable logic circuitry.

19 Claims, 16 Drawing Sheets

MICRO-NETWORK-ON-CHIP AND MICROSECTOR INFRASTRUCTURE

BACKGROUND

The present disclosure relates to integrated circuit devices that use programmable structures arranged in microsectors.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Advances in microelectronics have enabled the continued increase in transistor densities and bandwidths for a variety of integrated circuit devices and communication techniques. Indeed, some advanced integrated circuits, such as field programmable gate arrays (FPGAs) or other programmable logic devices, may include large number of transistors that enable an increasingly wide variety of programmable circuit designs to be programmed into programmable fabric for implementation of a large number of different functions. In some cases, data generated by the functions may be packetized and routed to or from other devices to execute an operation or to communicate results of an operation. However, since a circuit design for a programmable logic device may be customized by a user for a particular application, relatively large sector-based registers used in logic fabric of these devices may over-allocate regions within the logic fabric for the circuit design.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

Figure 1:
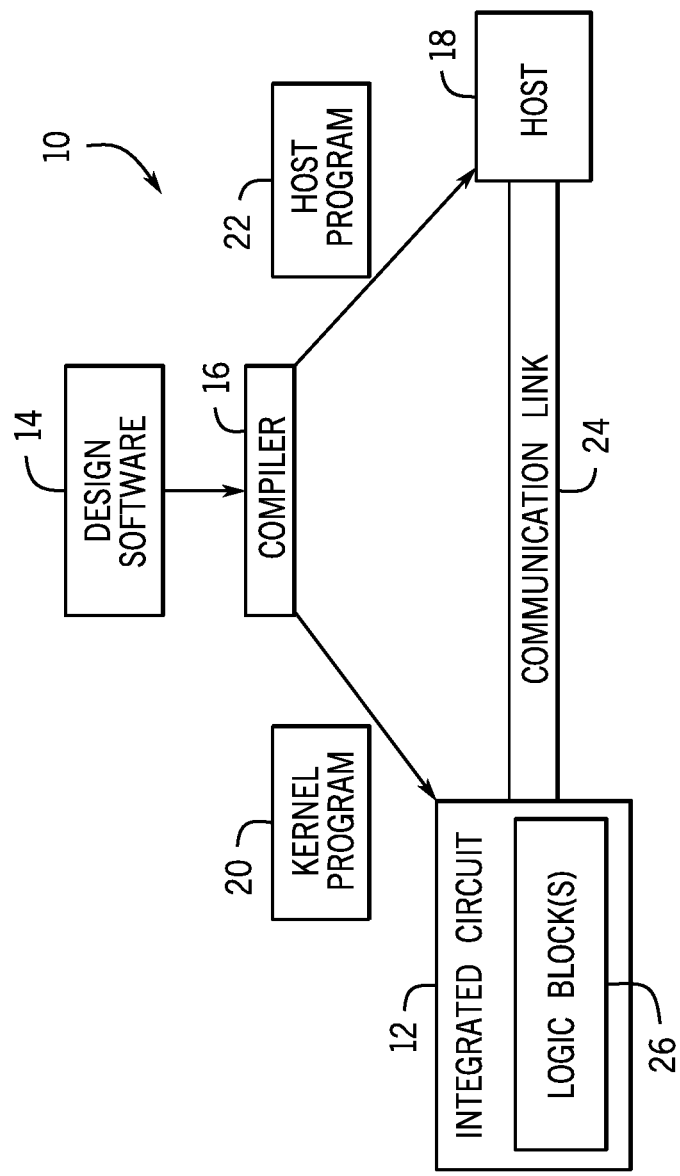
FIG. 1 is a block diagram of a system used to program an integrated circuit, in accordance with an embodiment.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. The techniques presented and claimed herein are referenced and applied to material objects and concrete examples of a practical nature that demonstrably improve the present technical field and, as such, are not abstract, intangible or purely theoretical.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical exclusive-OR (XOR)). In other words, the phrase A "or" B is intended to mean A, B, or both A and B.

Programmable logic devices are increasingly permeating markets and are increasingly enabling customers to implement circuit designs in logic fabric (e.g., programmable logic). Due to the highly customizable nature of programmable logic devices, the logic fabric is to be configured with a circuit design prior to use of the circuit corresponding to the circuit design. When implementing designs in the logic fabric, sectors may be used to allocate portions of the logic fabric to implement the circuit. However, a sector may be a relatively imprecise and/or large allocation of total logic fabric area due at least in part to data registers and physical arrangements of interconnections of the programmable logic device.

By rearranging some of the interconnections of the programmable logic device and/or by shrinking a data width of the data registers, systems and processes for implementing a circuit design in logic fabric may improve. For example, by making some of these changes, a size of the sector may be reduced and form a microsector, permitting a relatively finer granularity of assignment to be used to allocate the logic fabric to the circuit design. This may, for example, permit a more efficient allocation of resources to respective circuit designs, and thus enable circuit designs to use less resources in implementation.

Since a circuit design for a programmable logic device may be customized by a user for a particular application, the ability to partition and control the configuration of the device at a fine grain and/or in parallel (as may be afforded by rearrangement of the interconnections and/or shrinking of a data width of data registers) enables a number of advantages particular to devices with programmable logic. Some of the advantages may be in the construction of the device and some advantages are in the use models for the device that are enabled (e.g., enabled or permitted use cases). For construction of the device, fine-grained configurable regions may be a mechanism to enable building a device with a suitable or tailored amount of resources for implementation of that device. Some of the new use models are enabled by faster configuration, faster partial reconfiguration, and faster single-event update (SEU) detection for smaller regions of the device when compared to other systems and methods for programmable logic device programming.

These changes in system implementation may also improve (e.g., reduce) overall configuration times, including reducing configuration times used when performing partial reconfigurations, and may also enable faster single-event upset (SEU) detection. For example, the proposed structural changes described herein may enable partial reconfiguration to occur in similar amounts of time as a normal configuration.

The microsector infrastructure may use a smaller number of columns (e.g., 8 columns vs 50 columns) in a single fabric row (row region). The row region may receive data from a smaller data register (e.g., 1-bit data register as opposed to a 32-bit data register). Since a microsector may represent a relatively small percentage of area of a programmable logic device (e.g., less than 1% of total fabric area), it may be feasible to have the microsector become the partial reconfiguration quanta. This may enable the partial reconfiguration to be a write-only operation that avoids performing a read-modify-write each time partial reconfiguration is to occur for the microsector, thereby saving time and resources for the partial reconfiguration. In some cases, the partial reconfiguration time may be reduced by a factor of five or six, a relatively high amount of performance improvement.

Furthermore, since the number of columns is reduced, the amount of time spent waiting for a data transmission to complete (either to the row region or from the row region) may reduce, thereby improving operation of the programmable logic device.

A microsector architecture may be combined with network-on-chip (NOC) data transmission methods. Standard NOC implementations are sometimes inefficiently applied field programmable gate arrays (FPGAs) or other programmable logic devices. For example, these implementations do not account for repetitive nature of the FPGA programmable logic, nor account for aspect ratio differences and data density implications of connecting to FPGA programmable logic with a standard NOC. Thus, merely using programmable logic with a standard NOC may limit usability, may reduce available transaction bandwidths, and may increase latencies.

This disclosure describes an interface that enables communication between programmable logic having a microsector architecture and a NOC, while avoiding adverse effects from interfacing the two. In particular, this disclosure describes data transactions associated with a microsector architecture that may use one or more micro-network-on-chips (microNOCs) disposed within and/or is integrated into the microsector architecture to form a columnar-oriented networked structure that uses extensible data handling processes. The columnar-oriented networked structure is a repetitive structure used to interface between programmable logic and one or more NOCs, which fits within programmable logic memory columns (e.g., FPGA fabric memory columns). The extensible columnar-oriented networked structure may permit high bandwidth and relatively complex data transactions similar to transactions performed using a network-on-chip (NOC) but without burdening the device with a large footprint or a performance penalty. These benefits may be provided natively with the architecture and independent of any further performance optimizations made by a complier or during a programmable logic design process.

Indeed, described herein are structures that provide one or more microNOCs as well as methods that may be used to address specific microNOCs or specific devices of a microNOC (i.e., specific microsectors). These systems and methods may provide a control mechanism to request loading and unloading of specific memories associated with specific microNOCs (e.g., specific memories of specific row controllers) to or from on-chip memories or off-chip memories. Furthermore, these system and methods may dramatically reduce the complexity of routing of high-bandwidth data buses between memory and into programmable logic (e.g., deeply located configuration memory) while increasing ease of use for customers and control systems implementing the transactions. Reducing system complexity may cause reduced power consumption and more efficient resource consumption within an integrated circuit performing these memory transactions. Indeed, these systems and methods may reduce power consumption amounts associated with moving data from off-chip memory interfaces to programmable logic by using dedicated bussed routing to portions of the microNOCs, as opposed to soft logic routing. It is noted that soft logic routing uses relatively large quantities of flip-flops and/or latches to exchange data, which may increase latencies with data transmissions and may depend on a distributed clocking signal network propagating clocks with aligned timings. By reducing an amount soft logic-based routing used to transmit data, data transmissions may happen faster with less of a reliance on precise clocking alignments and with the additional benefit of freeing up soft logic for other uses.

A microNOC may include a column of row controllers each connected to a shared data path (e.g., a shared vertical data path) and a respective microsector. The data path and the row controllers of the microNOC may include hardened logic. The row controller may include hardened logic, which interfaces with the hardened logic and the soft logic of the microsector. The row controller may communicate with controllers disposed outside of a programmable logic by way of messages transmitted via the shared data path. These messages may include transaction-related data, headers, command indications, slots for data to be stored in, or the like, to communicate between the row controllers and other devices, such as devices external to the microsector, other row controllers, or even portions of programmable logic programmed to perform a logic function.

Data may be transmitted to one or more microsectors using data streaming protocols and using bi-directional movements. In this way, one or more row controllers may inspect a header of a packet before accessing a payload of the packet to determine which of the row controller the packet is to be delivered. When a row controller finds a packet has a header matching its own identifier, the row controller may receive the packet and process any data and/or command included in the packet. This structure may help improve transaction speeds since multiple concurrent traffic flows in one or two data movement directions may occur even within a same column of microsectors. For example, the microNOC includes a shared data path that uses data streaming processes to deliver different commands to different row controllers at a same time by segregating command delivery in different packets with different headers.

A microNOC, a column manager, and/or a row controller may each be individually addressed using a logical address described herein. This may enable direct access to a location in programmable memory by direct addressing to its corresponding row controller. A logical address space is discussed herein. Using the logical address space to address a packet to a specific row controller in combination with routing circuitry between column managers and paths to microNOCs may enable any peripheral device in communication with a NOC and/or any column manager to communicate with the specific row controller.

Data transactions may occur between a row controller and any suitable data source and/or end point using direct addressing. This may permit a logic design implemented in a portion of programmable logic to generate an instruction to cause a reading or writing of data to another portion of programmable logic. Each column manager may help perform several types of transactions, and each type of transaction may use the direct addressing process. These transactions may include a directly addressed read, a directly addressed write, a first-in, first-out (FIFO) read (e.g., streaming read), a FIFO write (e.g., streaming write), a load (e.g., plural write, batch write), and an unload (e.g., plural read, batch read).

Transactions involving directly addressed reads or writes may use addresses from a global address space that reference specific row controllers (or groups of row controllers) to access data stored in microsectors. These transactions may read or write any suitable number of words from any location in any enabled row controller (e.g., a row controller having an address assigned). Transactions involving FIFO reads or writes may continuously stream data to or from one or more row controllers and to or from another device (e.g., an on-chip memory, an off-chip memory, one or more processors). Moreover, transactions involving loads or unloads may be used to perform a block movement between one or more row controllers and another device (e.g., an on-chip memory, an off-chip memory, one or more processors).

Direct addressing methods and data streaming methods may permit a relatively large amount data to transmit between programmable logic and a data source (or data end point). For example, a column manager directly addressing one or more row controllers and/or one or more microNOCs for a transaction may improve processing speeds associated with moving data for machine learning uses, signal processing uses, graphic processing unit (GPU) calculations, and/or other data intensive uses by simplifying these otherwise complex transactions.

Another benefit from using addressing methods and the microNOCs described herein includes the ability to store data in a different order than a logical read and/or write order. Data may be read from a register of a column manager in a logical order. But, the data may be read from the programmable logic in a different order than the logical order. The feature of being able to read and write data into the different row controllers in an order differing from this logical order represents a dramatic improvement in memory access, and more particularly, programmable logic access methods. This is an improvement beyond typical processes than involve reading and writing data into programmable logic according to the logical order. Being able to store data in any order may permit column managers to store the data in a convenient order for the operation rather than being restricted to the logical order. Thus, the column managers may have the capability to pack data in a single microNOC column or according to data striping processes across multiple microNOC columns, in whichever order is deemed more convenient (e.g., of lower cost, of lower memory usage overall, of lesser footprint) by the column manger and/or system overall.

With the foregoing in mind, FIG. 1 illustrates a block diagram of a system 10 that may implement arithmetic operations. A designer may desire to implement functionality, such as the arithmetic operations of this disclosure, on an integrated circuit 12 (e.g., a programmable logic device such as a field-programmable gate array (FPGA) or an application-specific integrated circuit (ASIC)). In some cases, the designer may specify a high-level program to be implemented, such as an OPENCL® program, which may enable the designer to more efficiently and easily provide programming instructions to configure a set of programmable logic cells for the integrated circuit 12 without specific knowledge of low-level hardware description languages (e.g., Verilog, very high speed integrated circuit hardware description language (VHDL)). For example, since OPENCL® is quite similar to other high-level programming languages, such as C++, designers of programmable logic familiar with such programming languages may have a reduced learning curve than designers that are required to learn unfamiliar low-level hardware description languages to implement new functionalities in the integrated circuit 12.

The designer may implement high-level designs using design software 14, such as a version of INTEL® QUARTUS® by INTEL CORPORATION. The design software 14 may use a compiler 16 to convert the high-level program into a lower-level description. The compiler 16 may provide machine-readable instructions representative of the high-level program to a host 18 and the integrated circuit 12. The host 18 may receive a host program 22, which may be implemented by the kernel programs 20. To implement the host program 22, the host 18 may communicate instructions from the host program 22 to the integrated circuit 12 via a communications link 24, which may be, for example, direct memory access (DMA) communications or peripheral component interconnect express (PCIe) communications. In some embodiments, the kernel programs 20 and the host 18 may enable configuration of a logic block 26 on the integrated circuit 12. The logic block 26 may include circuitry and/or other logic elements and may be configured to implement arithmetic operations, such as addition and multiplication.

The designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Figure 2:
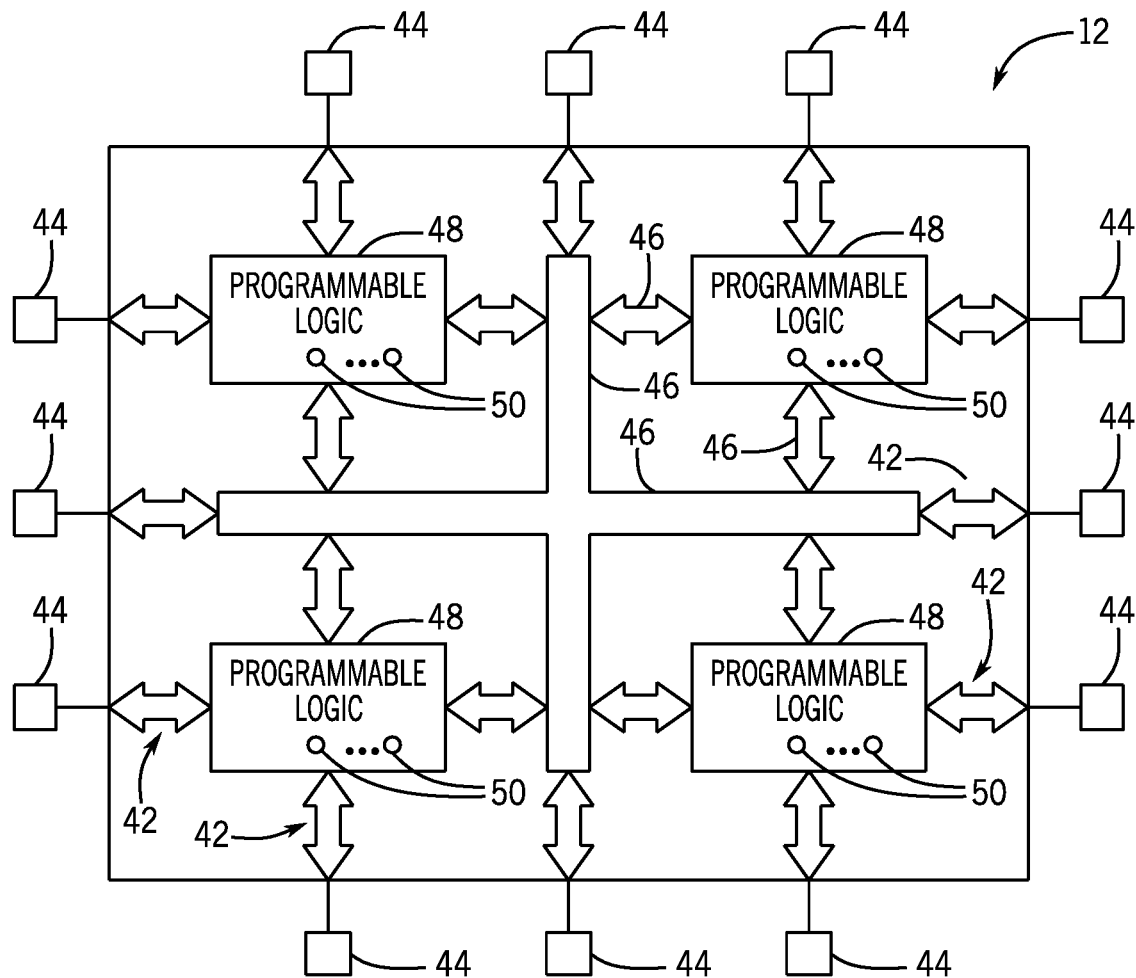
FIG. 2 is a block diagram of the integrated circuit of FIG. 1, in accordance with an embodiment.

Turning now to a more detailed discussion of the integrated circuit 12, FIG. 2 is a block diagram of an example of the integrated circuit 12 as a programmable logic device, such as a field-programmable gate array (FPGA). Further, it should be understood that the integrated circuit 12 may be any other suitable type of programmable logic device (e.g., an ASIC and/or application-specific standard product). The integrated circuit 12 may have input/output circuitry 42 for driving signals off of the device (e.g., integrated circuit 12) and for receiving signals from other devices via input/output pins 44. Interconnection resources 46, such as global and local vertical and horizontal conductive lines and buses, and/or configuration resources (e.g., hardwired couplings, logical couplings not implemented by user logic), may be used to route signals on integrated circuit 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as the integrated circuit 12, may include programmable elements 50 with the programmable logic 48. For example, as discussed above, a designer (e.g., a customer) may (re)program (e.g., (re)configure) the programmable logic 48 to perform one or more desired functions. By way of example, some programmable logic devices may be programmed or reprogrammed by configuring programmable elements 50 using mask programming arrangements, which is performed during semiconductor manufacturing. Other programmable logic devices are configured after semiconductor fabrication operations have been completed, such as by using electrical programming or laser programming to program programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using input/output pins 44 and input/output circuitry 42. In one embodiment, the memory cells may be implemented as random-access-memory (RAM) cells. The use of memory cells based on RAM technology is described herein is intended to be only one example. Further, since these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Keeping the discussion of FIG. 1 and FIG. 2 in mind, a user (e.g., designer) may use the design software 14 to implement the logic block 26 on the programmable logic 48 of the integrated circuit 12. In particular, the designer may specify in a high-level program that mathematical operations such as addition and multiplication be performed. The compiler 16 may convert the high-level program into a lower-level description that is used to program the programmable logic 48 to perform addition.

Figure 3:
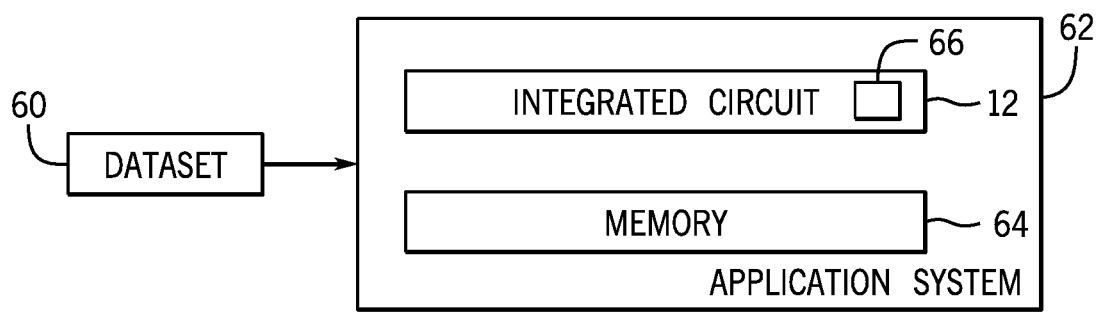
FIG. 3 is a block diagram of an application system that includes the integrated circuit of FIG. 1 and a memory, in accordance with an embodiment.

Once programmed, the integrated circuit 12 may process a dataset 60, as is shown in FIG. 3. FIG. 3 is a block diagram of an application system 62 that includes the integrated circuit 12 and memory 64. The application system 62 may represent a device that uses the integrated circuit 12 to perform operations based on computational results from the integrated circuit 12, or the like. The integrated circuit 12 may directly receive the dataset 60. The dataset 60 may be stored into the memory 64 before, during, or concurrent to transmission to the integrated circuit 12.

As bandwidths and processing expectations increase, such as in response to the advent of fifth generation (5G) and higher communication techniques and/or widespread use of neural networks (e.g., machine learning (ML) and/or artificial intelligence (AI) computations) to perform computations, the integrated circuit 12 may be expected to handle subsequent increases in size of the dataset 60 over time. The integrated circuit 12 may also be expected to perform digital signal processing operations of signals transmitted using 5G or higher techniques (e.g., signals of higher throughput and/or high data transmission bandwidths) and ML operations. These desired applications may also be implemented dynamically, during runtime, such as during a partial reconfiguration that causes configuration of a portion of the integrated circuit 12 without causing configuration of another portion of the integrated circuit 12 during runtime operations of the integrated circuit. For at least these reasons, it may be desired to improve configuration methods to meet complexity and timing specifications of technical computations. To do so, programmable logic 66 that includes at least the programmable logic 48, the input/output pins 44, and interconnection resources 46, may leverage a 1-bit data register to (re)configure the programmable logic 48 using microsectors. Using microsectors to program circuitry functions in the programmable logic 48 may provide the advantages of enabling write-only reconfiguration, relatively smaller region SEU detection (e.g., 1-bit region of detection), relatively smaller granularities for reconfiguration regions, and relatively larger parallel configuration (e.g., parallel configuration of data channels of 1-bit width) operations. As used herein, the term microsector refers to a sector of programmable logic that has a data register that is comparatively small. In one example, a microsector has a 1-bit data register. In some embodiments, a microsector may have a larger data register, but still may be smaller than what is ordinarily found in a sector (e.g., may be less than 32 bits, less than 16 bits, less than 8 bits).

Figure 4B:
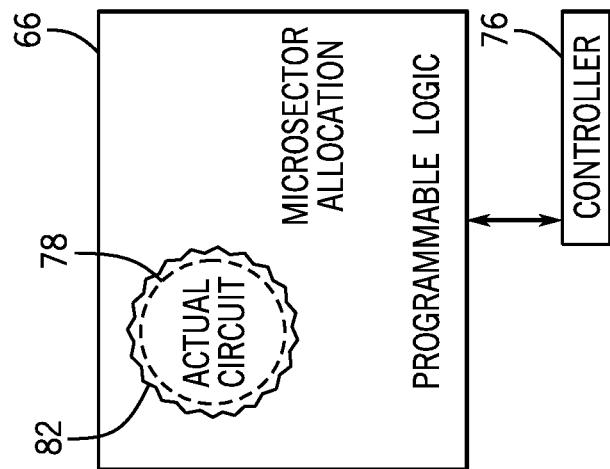
FIG. 4B is a block diagram of programmable logic of the integrated circuit of FIG. 1 implemented using microsector allocations, in accordance with an embodiment.
Figure 4A:
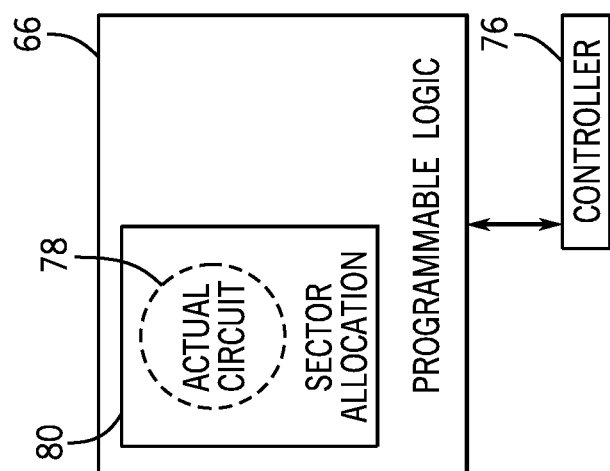
FIG. 4A is a block diagram of programmable logic of the integrated circuit of FIG. 1 implemented using sector allocations, in accordance with an embodiment.

To elaborate regarding the smaller granularities for reconfiguration regions, FIG. 4A is a block diagram of example programmable logic 66. The programmable logic 66 may include a controller 76 to program the programmable logic 66. When programmed, the circuitry of the programmable logic 66 may be used to perform digital signal processing, machine learning processing, computations, logic functions, or the like (e.g., represented by portion 78). However, the programmable logic 66 may be divided in relatively large logical sectors, and thus a portion 80 may be allocated to the circuitry as opposed to a region of circuitry corresponding to the portion 78. This overallocation of resources may waste circuitry since size differences between the portion 80 and the portion 78 represent underutilized programmable logic 66. It is noted that when partially reconfiguring programmable logic 66, certain speed metrics may be desired to be met (e.g., partial reconfiguration may be desired to be completed in a relatively fast amount of time). In these cases, for example, overallocation of resources may occur since slower configuration speeds may be undesired that may improve allocation of resources.

Indeed, if a device is built in the programmable logic of a multiple of sectors, the device may likely have more or less logic (e.g., logic arithmetic blocks (LABs), digital signal processing (DSP) blocks) than is desired to be allocated to building the device. This overallocation may occur since a rectangular number of sectors is used to implement the example device. By rearranging the interconnections and/or shrinking a data width of data registers to form microsectors, a relatively more exact amount of logic (e.g., more accurate number of LABs or DSP blocks) may be allocated to implementation of the device.

When implementing circuitry represented by the portion 78 in programmable logic 66 that uses microsector logical divisions, as shown in FIG. 4B, less programmable logic 66 may be wasted when implementing the circuitry. FIG. 4B is a block diagram of the programmable logic 66 implemented using microsectors. Indeed, microsectors may permit the circuitry corresponding to the portion 78 to be implemented in a region represented by portion 82. Although not drawn to scale, the portion 82 implementing circuitry corresponding to the portion 78 efficiently utilizing the programmable logic 66 where the portion 80 implementing the portion 78 may otherwise inefficiently utilize the programmable logic 66.

Figure 5:
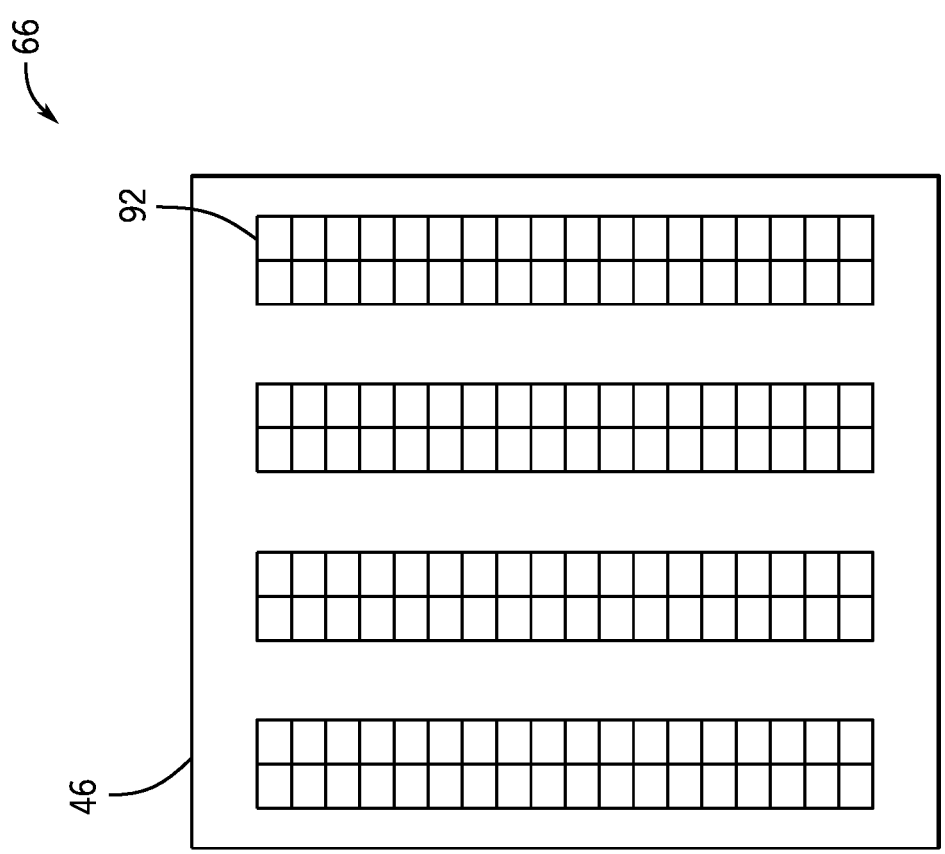
FIG. 5 is a block diagram of the programmable logic of FIG. 4B, in accordance with an embodiment.

To elaborate further on a microsector architecture, FIG. 5 is a block diagram of the programmable logic 66. The programmable logic 66 may couple between microsectors 92 using the interconnection resources 46. Indeed, the interconnection resources 46 may include any suitable combination of data shifting registers, registers, logical gates, direct couplings, reprogrammable circuitry, or the like able to be used to move data from a first location to a second location within the programmable logic 66 and/or within the integrated circuit 12. One or more microsectors 92 may be programmed by the controller 76 with information to perform functions of circuitry, such as the circuitry corresponding to portion 78. However, since the controller 76 may transmit configuration data (or any suitable data), the granularity of regions used to program functions into the programmable logic 66 may reduce. When these granularities reduce or become more precise (e.g., smaller), programming of the programmable logic 66 may improve since circuit designs may be more efficiently configured in the programmable logic 66. It is noted that the programmable logic 66 and/or the integrated circuit 12 may be any suitable type of software or hardware, or a combination of the two. The integrated circuit 12 and/or the programmable logic 66 may be or include programmable logic 48, programmable elements 50, or the like, to enable one or more portions to be reprogrammable (e.g., reconfigurable). The controller 76 may interface with the microsectors 92 using the interconnection resources 46 that may include interface buses, such as an advanced interface bus (AIB) and/or an embedded multi-die interconnect bridge (EMIB). As described above, the programmable logic 66 may be a reprogrammable circuit capable of performing a multitude of tasks.

Figure 6:
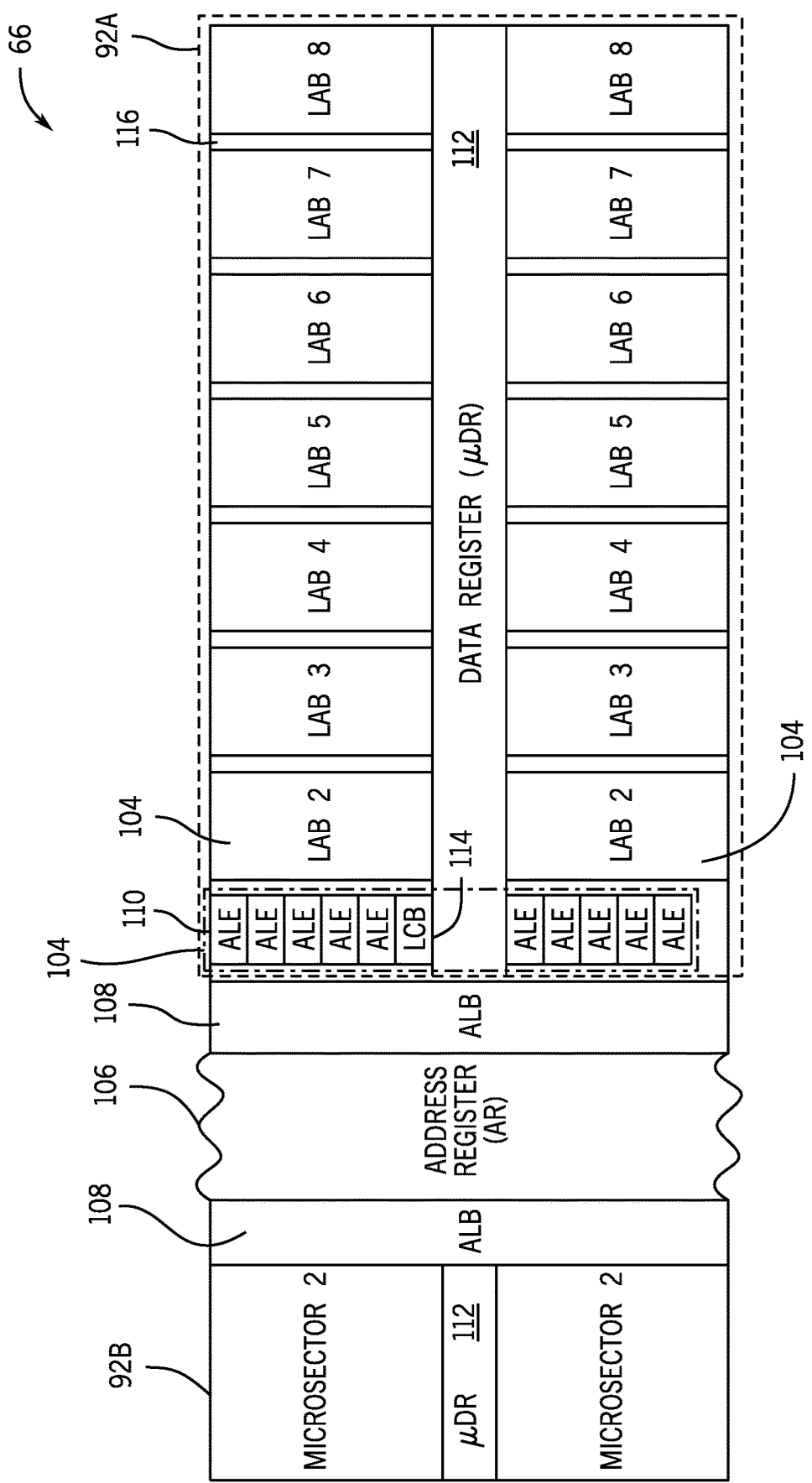
FIG. 6 is a block diagram of a microsector of the programmable logic of FIG. 5, in accordance with an embodiment.

FIG. 6 is a block diagram of two example microsectors 92 (e.g., microsector 92A, microsector 92B). This application describes a particular architecture of microsectors 92, however it should be understood that any suitable architecture may be used. Indeed, each microsector 92 may include one or more logic access blocks (LAB) 104 (e.g., eight LABs) able to interface with the interconnection resources 46 (shown here to communicate with the microsectors 92 via an address register 106 (AR)). Indeed, the interconnection resources 46 may include one or more ARs 106 to transmit and/or receive signals from the microsectors 92, as well as or in alternative of other control circuitry, logic circuitry (e.g., AND gates, OR gates, not-OR gates, exclusive-OR gates, flip-flops, switch-reset (SR) latches), or the like. It should also be understood that same or similar circuitry may be included in each microsector 92.

The LABs 104 may receive data from the AR 106 through an address line buffer (ALB) 108. The ALBs 108 may each include digital signal processing (DSP) circuitry and/or control circuitry that converts data from a suitable format for transmission to the microsector 92A to a suitable format for use by circuitry of the LAB 104. Sometimes the LABs 104 may couple to a scan register used to perform operational verification and/or data integrity operations. The scan register may be a dedicated data transmission path, such as a path used independent of other data transmission paths through the microsector 92.

Each LAB 104 may include some number of arithmetic logic element circuitry (ALE) 110 circuits (e.g., ten ALEs 110). A micro-data register (μDR) 112 may be disposed on at least some of the ALEs 110, such as in another layer of silicon, or other material, used to physically form the integrated circuit. The μDR 112 communicatively couples each LAB 104 to the ALB 108. Each ALE 110 of the LAB 104 may share and/or couple to the LAB-wide Control Block (LCB) 114. The LABs 104 are separated from each other by routing fabric 116 (e.g., configuration random access memory (CRAM), configuration memory). In this example, the μDR 112 runs through the LCB 114 via a center of a row of circuitry corresponding to the microsector 92A.

Figure 7:
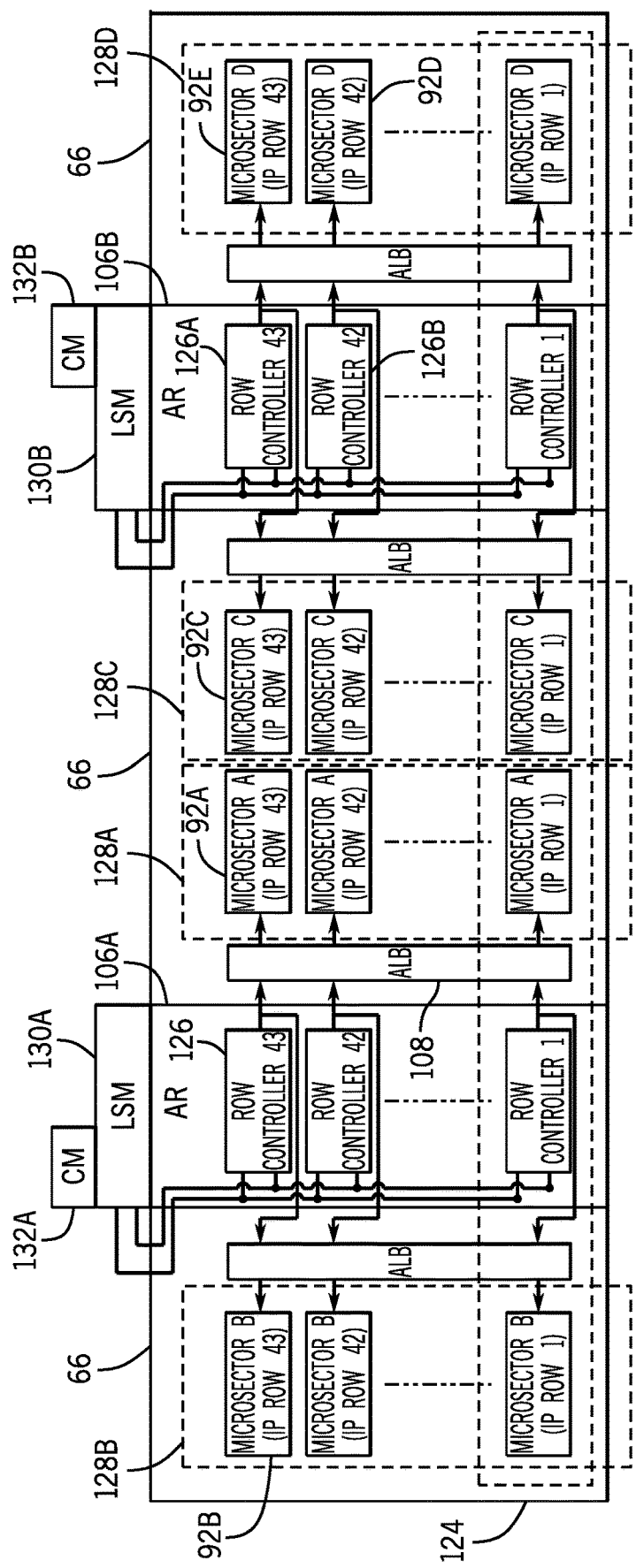
FIG. 7 is a block diagram of a portion of the programmable logic and at least some control circuitry for the portion of the programmable logic, in accordance with an embodiment.

To elaborate further on interconnections between the AR 106 and the microsectors 92, FIG. 7 is a block diagram of rows regions (row regions) 124 and row controllers 126 implemented in the AR 106 illustrating communicative couplings between the row controllers 126 and the microsectors 92 from FIG. 6. It is noted that microsectors 92 may sometimes be referred to in terms of row regions 124 since designs like manufacturer designs or user designs may be loaded into the microsectors 92 for implementation. The AR 106 may include any suitable control system circuitry and/or logic circuitry. Indeed, the AR 106 may be an address register from INTEL® STRATIX 10® or INTEL®

AGILEX® by INTEL CORPORATION. Furthermore, the AR 106 shown is disposed between at least two microsectors 92. There are some instances where the AR 106 may be disposed by just one column region 128 of microsectors 92 (e.g., orientated on the right side of the AR 106 or on the left side of the AR 106) to accommodate physical boundaries of the programmable logic 66 or the integrated circuit 12 or to avoid supporting left and right data movement patterns. The various row regions 124 and column regions 128 are arranged as a grid on a same physical board.

Each row controller 126 may control a row region 124 of microsectors, and thus be associated with or be the ALB 108 described earlier. For the microsector implementation, the AR 106 may be repeated and shared between column region 128 (e.g., column region 128A, column region 128B, column region 128C, column region 128D) of microsectors 92. For example, column region 128A shares an AR 106A with the column region 128B, and is disposed adjacent to a column region 128C. The microsectors 92 of the column region 128C may share the AR 106B with microsectors 92 of the column region 128D. Thus, the microsectors 92 of column region 128C may be controlled using signals generated and/or transmitted by the row controllers 126 of the AR 106B independent of at least some signals transmitted via the AR 106A. Although part of a same row region 124, the microsector 92C may be controlled differently from the microsector 92B since the microsectors 92 being associated with different column region 128. Furthermore, although part of a same column region (e.g., column region 128C), the microsector 92C may be controlled differently from the microsector 92D since the microsectors 92 receive control signals from separate row controllers 126 (e.g., row controller 126A, row controller 126B). Microsectors 92 may be formed to divide the row region 124 into smaller portions, and thus provide the smaller granularity.

The row controllers 126 may use any suitable communication protocol to transmit and/or receive signals from respective microsectors 92. For example, the row controllers 126 may use a streaming protocol to transmit one or more streaming data packets, such as Advanced eXtensible Interface (AXI) 4 Streaming, to receive an address and data corresponding to the address in a same symbol (e.g., same packet transmission) at internal write registers (e.g., internal to a respective row controller 126).

Each AR 106 may include a local sector manager (LSM) 130 (e.g., LSM 130A, LSM 130B) at the bottom or top of the AR 106 column region to interface with its corresponding CM 132. For example, the LSM 130A is shown at the top of and communicatively coupled to the AR 106A column region and the CM 132A. The LSM 130A is also disposed outside of the programmable logic 66. One LSM 130 may be included per AR 106, however it should be understood that LSMs 130 may be shared by two or more AR 106, such that one LSM 130 controls two or more AR 106.

Sometimes, the LSMs 130 may be integrated with an AR column manager (CM) 132 (e.g., CM 132A, CM 132B) to form respective sector column managers (SCM). Although depicted as separate blocks, CMs 132 may be included in a same column manager. An example layout of a CM 132 with associated AR 106 is described below with reference to FIG. 8.

Each CM 132 may be responsible for managing transactions between device of its corresponding AR 106 and the interconnection resources 46. For example, the CM 132A may coordinate with the LSM 130A to transmit a command to the microsector 92A and the microsector 92B. The CM 132 and LSMs 130 may be involved with routing commands, such as configuration instructions, to certain microsectors 92 from other portions of the integrated circuit 12 or from other microsectors 92. In cases where the interconnection resources 46 involve use of a network-on-chip, the CMs 132 may manage transactions between the network-on-chip and the corresponding AR 106. This arrangement may permit relatively high bandwidth data movement between master and slave bridges implemented via the interconnection resources 46 since, for example, the CMs 132 may help coordinate transmission between multiple microsectors and/or multiple ARs 106, such that the transmissions may be paralleled, or at least partially coordinated in time and/or in sequence.

A controller, such as the controller 76, may transmit packets to each of the LSMs 130 and/or CMs 132 that include data and commands to perform a configuration and a test of the configuration. To implement the configuration, one or more LSMs 130 may generate respective commands interpretable by respective row controllers 126, where the respective commands may be used to control configuration of one or more microsectors 92. The data and commands transmitted to a LSM 130 from the controller 76 may correspond to a portion of a circuit design represented by the configuration to be implemented in the subset of microsectors 92 managed (e.g., communicatively coupled) to the respective LSM 130. Once the configuration is implemented in the programmable logic 66 (or at least partially implemented), the one or more LSMs 130 may test the implemented configuration to verify that the configuration operates as expected. The test may be performed using a portion of the data and commands received by the LSM 130 from the controller 76. The LSMs 130 may test the respective portion of the circuit design corresponding to its respective intersections of column regions 128 and row regions 124 at least partially overlapping in time to the programming (e.g., configuration) of additional portions of the programmable logic 66, such as while one or more other row regions 124, column regions 128, or microsectors 92, continue to be programmed (e.g., configured). One or more row controllers 126 may program respective microsectors 92 in parallel and/or at least partially at an overlapping time period. Once each portion of the programmable logic 66 is programmed, the LSMs 130 may coordinate in operation and perform a system-wide test of one or more circuit designs implemented in one or more microsectors 92. Testing performed may include aggregation operations that verify operations of portions of circuitry, in addition to verifying whole circuit operation. Each LSM 130 may operate as a management engine for its local set of the microsectors 92.

Indeed, each row controller 126 may receive a command from its corresponding LSM 130 and may decode the command to generate control signals. The control signals may control operation of the corresponding row region 124 of microsectors 92. For example, the row controller 126A, coupled between the microsector 92C and the microsector 92E, may generate control signals used for controlling operation of the microsector 92C and the microsector 92E disposed in a same row region 124. Furthermore, as opposed to the LSM 130 controlling multiple column regions 128, each LSM 130 may control two column regions 128.

For example, the LSM 130 may generate commands associated with read and write operations. In some cases, the LSM 130 may also command the row controller 126 to decompress (e.g., decode) data associated with the command before transmitting data to a respective microsector 92. The row controller 126 may be considered a configuration endpoint that may be read from and/or written to by the LSM 130 and/or the controller 76 via the interconnection resources 46 to read or write data (e.g., configuration data, test data) to the microsector 92. It is noted that although shown as including 43 row regions 124, and 43 row controllers 126, any suitable number of row regions 124, column regions 128, and the like may be used in the integrated circuit 12 to implement systems and methods described herein.

Figure 8:
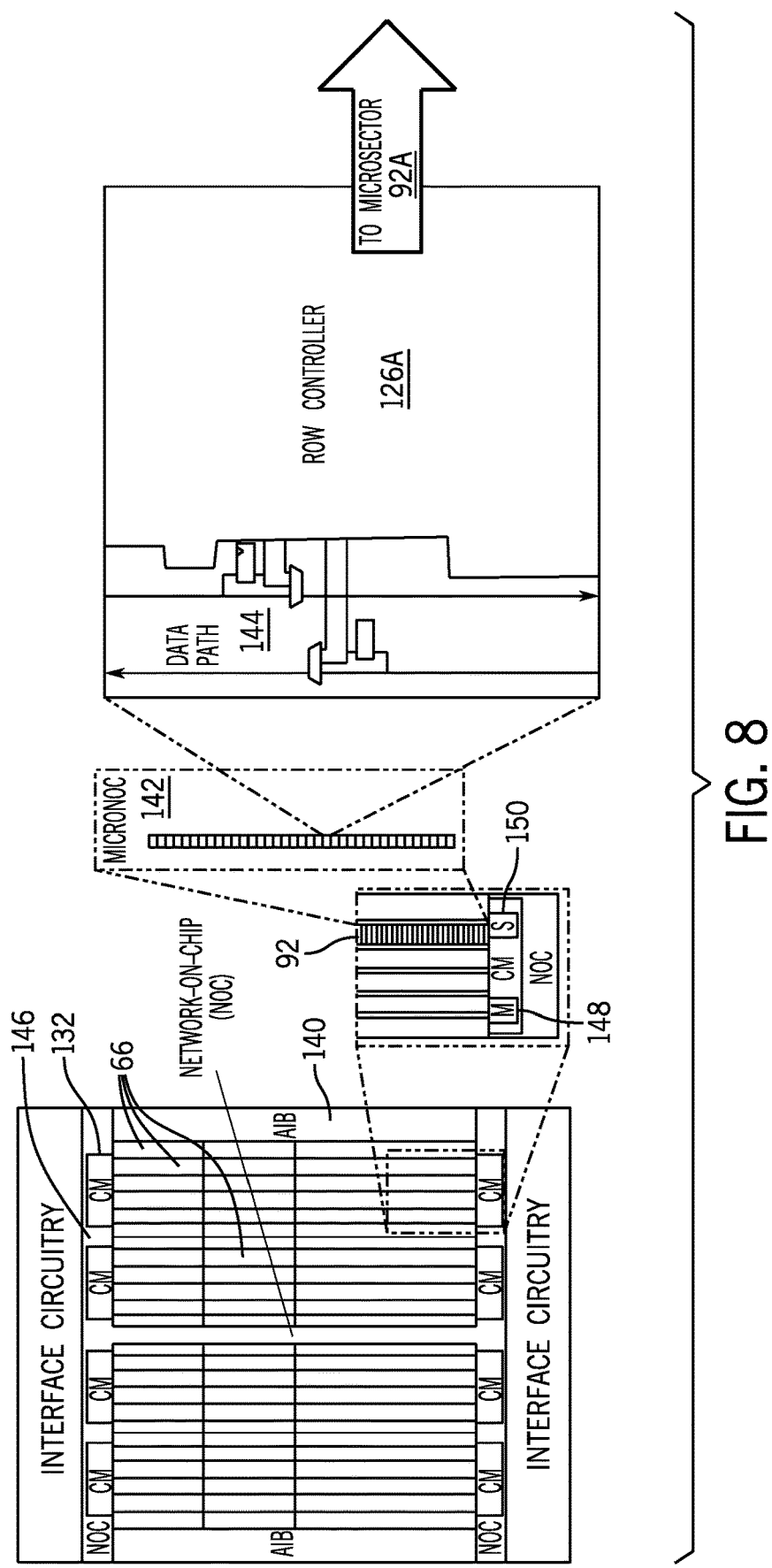
FIG. 8 is a block diagram of a micro-network-on-chip data path coupled to a row controller of FIG. 7, in accordance with an embodiment.

Continuing now to discuss an example chip layout and an example of the AR 106 (i.e., a micro-network-on-chip), FIG. 8 is a block diagram of a micro-network-on-chip (microNOCs) 142 that includes a bi-directional data path 144 and multiple row controllers 126. This extensible columnar-oriented network structure fits within fabric memory columns of the programmable logic 66, and permits data transaction operations like dynamic and/or static bandwidth allocations, virtual channels, and the like. This network structure may include control circuitry disposed between or outside portions of programmable logic 66. For example, CM 132 may be disposed outside the programmable logic 66 and/or the row controllers 126 may be disposed between portions of the programmable logic. Each microNOC 142 is formed from the bi-directional data path 144 interconnecting a column of row controllers 126 to a respective CM 132 and, if used, a respective LSM 130. A subset of microNOCs 142 may share the respective CM 132.

Each CM 132 may couple to a network-on-chip (NOC) 146. In some cases, the interconnection resources 46 may include and/or form the network-on-chip (NOC) 146. The NOC 146 may be disposed around a partial perimeter of the programmable logic 66 and/or an entire perimeter of the programmable logic 66. When used in an FPGA, the fabric of the FPGA die may integrate the NOC 146. The NOC 146 may communicate with the individual row controllers 126, and thus the programmable logic 66, using commands sent through the microNOCs 142. In some cases, the NOC 146 may include horizontal NOC circuitry and vertical NOC circuitry, such that the NOC 146 as a whole is not contiguous. Even in these cases, however, the NOC 146 intersects horizontally with each microNOC 142, and thus intersects horizontally with each microsector 92 corresponding to the programmable logic 66. The programmable logic 66 may be accessed by using row controllers 126 to interface with corresponding microsectors 92. Furthermore, each row controller 126 may include memory (e.g., random-access memory (RAM), cache memory) that may be accessed before, after, or in conjunction with access to associated programmable logic 66. The row controllers 126 of FIG. 8 may include the row controller 126A. It is noted that one or more of the microNOCs 142 may include additional circuitry not depicted or described herein.

A CM 132 may span multiple microNOC 142 columns (e.g., one, two, three, ten, any suitable number). In this example, one CM 132 may control five microNOC 142 columns. Each CM 132 may communicate with the row controllers 126 associated with the subset of microNOC 142 coupled to the CM 132. When transmitting a command, the CM 132 may receive the command, determine which portion of programmable logic 66 to communicate with based on the command, and determine which microNOC 142 to transmit the command based on the portion of programmable logic 66. Since the data path 144 is bi-directional, the CM 132 may transmit and receive messages simultaneously on a same microNOC 142.

To receive and/or transmit commands, the CM 132 may include a master interface 148 and a slave interface 150. In some cases, commands and/or data may be communicated from external software or a peripheral component using an advanced interface bus (AIB) 140 to a respective row controller 126 of a respective microNOC 142.

Figure 9:
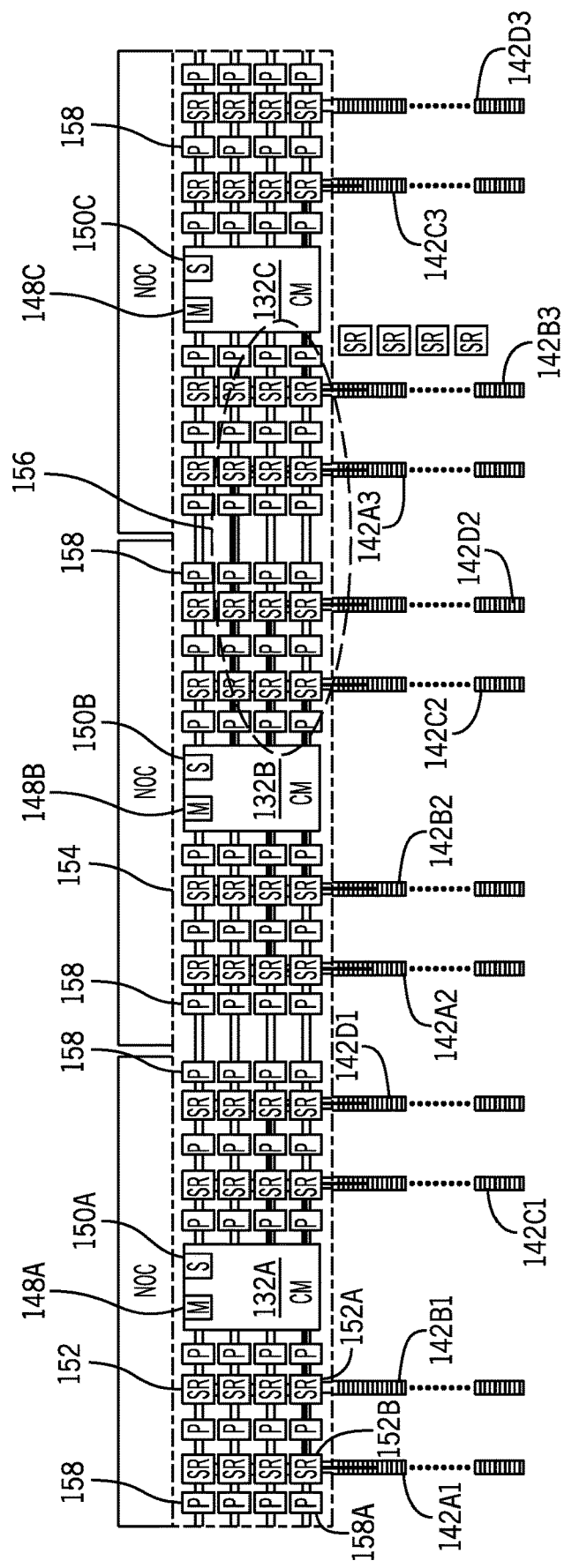
FIG. 9 is an illustration of example data flows associated with the column manager (CM) of FIG. 8, in accordance with an embodiment.

To elaborate on data handling operations, FIG. 9 is a block diagram of CMs 132 (CM 132A, CM 132B, CM 132C) respectively coupled to the microNOCs 142 (142A1, 142B1, 142C1, 142D1, 142A2, 142B2, 142C2, 142D2, 142A3, 142B3, 142C3, 142D3). Each CM 132 communicates with four microNOCs 142 to perform transactions. A transaction may originate from a portion of programmable logic 66, an external software, a peripheral component, another circuit of the integrated circuit 12, or any suitable hardware or software component able to communicate via the NOC 146.

The CMs 132, NOC 146, and/or the microNOC 142 may be physically arranged on the integrated circuit 12 to improve data transmissions. For example, a CM 132 may control operations of and communicate with microNOCs 142 disposed relatively far away, such as microNOCs 142 disposed 1 millimeters (mm), 2 mm, 3 mm, and so on (e.g., any suitable distance) from the CM 132. The CM 132 may also be co-integrated with the microNOCs 142 and/or the NOC 146 to form a co-integrated communication network. Co-integrated components may be implements as a single block instead of separating the components into separate blocks each connecting over high-level metals, enabling higher-bandwidth communications between the co-integrated components, higher levels of data integrity (e.g., quality of signal used to communicate the data), or both.

Furthermore, the microNOCs 142 may connect to a horizontal semi-statically routed pipelined row, represented by semi-static routing blocks (SR) 152. The data width of each respective SR block 152 may equal that of the microNOC 142 data path 144 (e.g., characterized by a same data width). The SR blocks 152 provide non-blocking pass-through to any of the block's four physical edges. In this way, a command transmitting to the SR block 152 from a first physical path intersecting on a first side may be physically transmitted to exit from any of the remaining three sides of the SR block 152. The SR block 152 having non-blocking pass-through capabilities may increase a number of routing combinations that may be used when passing data between the CMs 132 and the microNOCs 142.

Sometimes a message may include an identifier, as will be appreciated. The SR block 152 may read the identifier to determine when to turn the message from a subsequent SR block toward a microNOC 142.

For example, CM 132A may generate and transmit a message for transition to a row controller 126A coupled in microNOC 142A1. The message may include an identifier indicating the microNOC 142A1 as the destination for the message (and may include an identifier indicating the row controller 126A as a more specific destination for the message). SR block 152A may receive the message, determine the message is not for the microNOC 142B1, and pass the message to the downstream SR block 152B in response to determining that the message is not for its corresponding microNOC 142 (e.g., microNOC 142B1). The SR block 152B, in response to receiving the message, may repeat the sequence of operations performed by the SR block 152A. Indeed, the SR block 152B may receive the message and determine whether to pass the message to a downstream SR block (not pictured) via a pipeline stage 158A. The SR block 152B, however, may determine the message is destined for the microNOC 142A1 based on the identifier of the message, and determine to turn the message to the microNOC 142A1 in response to determining that the message is destined for its corresponding microNOC 142 (e.g., microNOC 142A1).

The "turn" operation is illustrated with the arrow showing how the message is turned and transmitted from routing network 154 to a respective microNOC 142. It is noted that the reverse operation may apply. That is, each SR block 152 may perform a similar analysis of an identifier of a message to determine a destination CM 132 for the message and to route the message.

The CMs 132 may sometimes pass messages from a microNOC 142 other than its own through to a downstream SR block 152. To pass messages, the CM 132 may read an identifier of the message indicating the destination microNOC 142 and/or row controller 126 and determine to pass-through the message without further processes. A bus used to pass messages through the CM 132 may not be illustrated and may be arranged such that the bus does not interrupt communication and/or coordination operations of the CM 132 when receiving message from its own microNOCs 142.

In some cases, each SR block 152 and pipeline stage 158 may operate according to programmed operations to pass or turn a message without first interpreting identifiers of a message. For example, a SR block 152 may operate according to a configuration that instructs the SR block 152 to default to passing to the left when a message is received from one path and to default to turning to the microNOC 142 when a message is received from a second path. A configuration may program the transmission pathways via the kernel program 20, via a configuration bitstream, or the like, or may be a hardcoded configuration. Similarly, the pipeline stage 158 may pass-through a received message between a first side and a second side of the pipeline stage 158. The respective pipeline stages 158 may not include inputs or outputs on a third side or a fourth side, or may not include inputs or outputs used to transmit the messages.

Connections between a CM 132 and a microNOC 142 may follow a 1:1 ratio, and the number of SR blocks 152 and/or of pipeline stages 158 may be scaled during design to keep the ratio constant. Take the example where a CM 132 controls operations of six microNOCs 142. This CM 132 may have six connections (e.g., one connection to each of the six microNOCs 142). Each of the six connections may have as many pipeline stages 158 and/or SR blocks 152 as suitable to transmit messages between the CM 132 and each of the microNOCs 142. The number of pipeline stages 158 and/or SR blocks 152 may be determined based on a physical footprint for each message to traverse (e.g., a size of the routing network 154), based on a logical footprint for each message to traverse (e.g., a number of clocking delays to be applied to each message), based on a logical design consideration (e.g., a number of times a particular message may be inverted to return to an original value), or the like.

The CM 132, in some devices, may transmit messages to a microNOC 142 of corresponding to a subset for a different CM 132 via the pipeline stages 158 and/or the SR blocks 152. For example, the CM 132A may transmit a message to microNOC 142B2 via pipeline stages 158 and/or SR blocks 152. Sometimes, to traverse a boundary within the routing network, the message is to pass through a CM 132. Each CM 132 may also be able to operate in a pass-through mode, where a received message may be transmitted to the other side of the CM 132. When passing-through a message, the CM 132 may or may not inspect a header of the message to determine which of its pipeline stages 158 to output the message to. In some cases, the CM 132 leave the inspection up to the routing network 154, where the routing network 154 may transmit the message to the correct microNOC 142.

Furthermore, sometimes the CM 132 may not have a pass-through mode. In these cases, the CM 132 uses the NOC 146 to transmit a message to another subset of microNOCs 142. For example, the CM 132B may use the NOC 146 to transmit a message to microNOC 142D3 since the microNOC 142D3 is outside of the corresponding subset of microNOCs 142 for CM 132B accessible via horizontal rows of the SR blocks 152. microNOC 142A3 is accessible to CM 132B via the horizontal rows of the SR blocks 152 while microNOC 142D3 may be inaccessible to CM 132B via the horizontal rows of the SR blocks 152, as is generally illustrated at reference number 156.

Each horizontal row of SR blocks 152 may correspond to a respective microNOC 142. However, any number of the SR blocks 152 and corresponding microNOCs 142 may interconnect between the CMs 132. The SR blocks 152 and pipeline stages 158 may add latency to a transmission path of a message, and thus may be used to even out timings between columns or portions of the integrated circuit 12.

Figure 10:
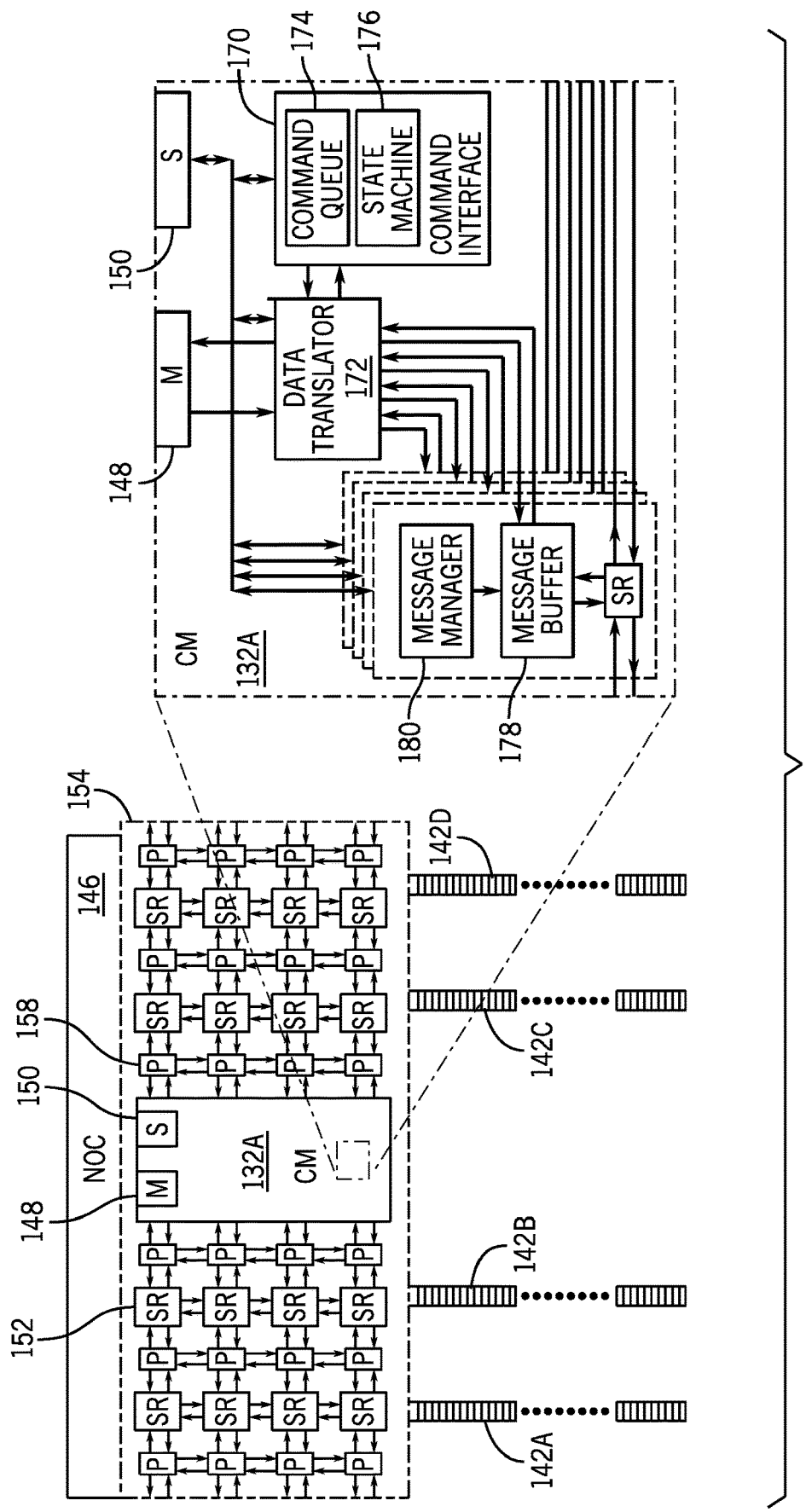
FIG. 10 is a block diagram of the column manager (CM) of FIG. 8, in accordance with an embodiment.

To elaborate, FIG. 10 is a block diagram of a respective CM 132 (referred to as CM 132A) coupled to the microNOCs 142 (142A, 142B, 142C, 142D). The CM 132A manages transactions between the NOC 146 and one or more of the microNOCs 142. Each CM 132 may use a different path to communicate with circuitry corresponding to different microNOCs 142.

The CM 132A may include interface circuitry 170 to receive a message for a transaction and a data translator 172 to change a format of the command before transmission between the CM 132A and the NOC 146 or the microNOC 142. The CM 132 may generate a message interpretable by the row controllers 126 from a command received at the slave interface 150 and/or at the master interface 148. The respective row controllers 126 may update a bit in a message after completing a transaction instructed by the message. Sometimes, new commands that reference or that are directed to a same location are delayed in a command queue 174 and thus are delayed from being written to that location until a current command completes.

The interface circuitry 170 may include one or more command queues 174 and one or more state machines 176. The interface circuitry 170 may manage transactions designated for the subset of the microNOCs 142A, 142B, 142C, and 142D corresponding to the CM 132. The command queues 174 may store commands received at the slave interface 150 and/or commands for transmission from the slave interface 150 in one or more queues. The command queues 174 may queue the actual command and/or may queue an indication of the command, where the indication may indicate from where the actual command may be retrieved. Commands may initiate and control microNOC 142 transactions between the CM 132A, the microNOC 142, and data endpoints (e.g., row controllers 126, programmable logic 66, other microNOCs 142, circuitry of the integrated circuit 12, AXI interface endpoints).

The state machines 176 may include a ratio of one state machine per concurrent traffic thread of the microNOCs 142. When each microNOC 142 is formed from a same type and quantity of components, each of the command queues 174 and the state machines 176 may include a same number of state machines.

The command queue 174 may include a set of registers in an address space of the slave interface 150 (e.g., a slave bridge). The command queue 174 may use a command pointer in this address space. The command pointer may increment to a next command (e.g., subsequently queued command) when the current command has issued. The command queue 174 and the state machines 176 may both reference the command pointer. The state machines 176 may use the command pointer to sequentially execute the commands in the command queue 174.

The state machines 176 may include registers in the slave interface 150 (e.g., slave register space) that perform the following operations: "go," "running," and "accept commands." During the "go" operations, one or more registers may handle data to cause the state machines 176 to process commands stored in the command queue 174. During the "running" operations, one or more registers may handle data to indicate that one or more of the state machines 176 are currently processing commands. During the "accept commands" operations, one or more registers may handle data to cause the state machines 176 to write to the command queue 174. The "accept commands" operations may be used to gracefully (e.g., not abruptly) stop currently dispatched commands. To do so, the state machines 176 may permit new commands to be written to the command queue 174, thereby reducing a likelihood of a command being stopped mid-execution. By reducing a likelihood of a command being stopped mid-execution, and thus reducing a likelihood of wayward (or residual) data from the stopped execution being leftover in pathways or circuitry, routing may be made less complex since data disposal routing may be excluded from some of a circuit design.

The data translator 172 and/or the NOC 146 may read from and/or write to the interface circuitry 170, thereby permitting message exchanges to occur between the NOC 146 and the microNOC 142. The interface circuitry 170 may generate a message from the received command using the command queue 174 and/or the state machines 176. The message may instruct the microNOCs 142 (e.g., the data paths 144, the row controllers 126) for a transaction. However, the received command may be of a different format, such as of a different addressing scheme or communication protocol, than that used by the microNOCs 142. A data translator 172 may convert the message between a first format and a second format interpretable by components of the microNOCs 142.

Indeed, the data translator 172 may convert commands from a format used for memory transactions (e.g., DDR commands) to a format used for programmable logic transactions (e.g., microNOC commands). The data translator 172 may use a lookup table to do so, or other suitable relational storage circuit. The data translator 172 may determine whether the command uses a transaction to a single microNOC 142 column or to multiple microNOC 142 columns. When the command indicates a transaction to multiple columns, the data translator 172 may replicate and modify the generated message to be used for the transaction spanning the multiple columns. The data translator 172 may select one or more of the microNOC 142 columns to transmit the generated message. After selecting the columns, the data translator 172 may embed an identifier of the particular row controller 126 within the selected column into the message. A subset of row controllers 126 may access the identifier to determine whether a message having the identifier is being delivered to that row controller 126. When a transaction spans two or more microNOC 142 columns, the data translator 172 may sort or pack the data from each column into a suitable word location for DDR memory and/or another peripheral to access. Sorting or packing may be looked up by the data translator 172 according to the identifier. All or some of these operations may similarly be performed for outgoing messages as well, either in a same or reverse order. Thus, the data translator 172 is a bi-directional circuit as well.

These generation and conversion operations may permit direct interfacing between memory peripherals and programmable logic. The capability to interface directly between a data or command source and an end point may reduce complexity of operations when moving large amounts of data, such as may occur in machine learning applications, artificial intelligence applications, internet-of-things applications, or the like. It is noted that either the memory peripherals, the programmable logic, or other components of the integrated circuit 12 or system 10 may act as either the data or command source or as the end point based on the type of operations that the components of the system 10 and/or integrated circuit 12 is performing. For example, an end point for the data changes based on whether a particular transactions is a read or a write.

The data translator 172 may include multiple, concurrently operations systems to permit overlapping conversion operations. Further parallel operations may occur when additional state machines are included in the interface circuitry 170. When the state machine 176 includes a first amount of state machines, the same first amount of outstanding transactions queued may be executed at one and at least partially in parallel by concurrently executing state machines. Furthermore, since each microNOC 142 is bi-directional, multiple commands for one or more transactions may be in process on the same microNOC 142 or on different microNOCs 142 at least partially at a same time. Concurrent transmission capabilities of the microNOCs 142 as described with the multiple commands may permit a full or nearly full bandwidth of each microNOC 142 to be utilized between one or more transactions.

After generation of the message, or before conversion of the message into an output to the NOC 146, the data translator 172 may communicate with one or more message buffers 178. The message buffers 178 respectively hold message data waiting to be transferred from a corresponding microNOC 142 to an interface bridge (e.g., AXI bridge) or from the interface bridge to the corresponding microNOC 142.

Communications to and/or from the message buffers 178 may be at least partially managed by one or more message managers 180. One message manager 180 may correspond to one or more message buffers 178, or vice versa, based on the construction of each respective circuit. A 1:1 ratio of allocation is shown in FIG. 10, but other permutations may be used.

In its simplest mode, the message manager 180 may issue messages as a function of commands residing in the command queue 174. In some cases, the message manager 180 may allocate bandwidth referenced when reading or writing message data from the message buffer 178. A message scheduler of the message manager 180 (not illustrated) may operate based on a stored configuration. Configuration data writes received via slave interface 150 may be used to adjust the stored configuration, and thus also be used to change operation of the message scheduler. The message manager 180 may determine an order to issue messages to the microNOC 142 based on location of the end point for the message (i.e., the physical placement of target row controller 126 within the microNOC 142 column) and/or based on a relatively priority of the message (e.g., determined by the message scheduler).

The message manager 180 may, using the message scheduler, issue different types of messages at different rates. The message manager 180 reference its stored configuration, to determine the different rates assigned to different microNOCs 142, different data sources (e.g., on-chip memory, off-chip memory), and/or different subsets of row controllers 126. Since each row controller 126 is assigned to access different portions of programmable logic 66, defining access rates to the different row controllers 126 and/or microNOCs 142 may be used to throttle or relatively adjust data transactions performed by different portions of the programmable logic 66. This relative rate assignment may permit allocation of faster rates to programmable logic 66 associated with higher priority tasks or to that which is associated with a customer that agreed to a faster rate.

Each microNOC 142 may have one or more physical channels for transporting data, provided that the total physical width of the physical channel fits within a physical width between adjacent portions of programmable logic 66 and the adjacent column of row controllers 126. The message buffer 178 and the message manager 180 may be replicated, along with any other suitable components or routing to support replication of these components like routing to the data translator 172. Replicating these components may enable transaction performances to increase (e.g., lower latency, more parallel operations) since the multiple physical channels may be used in a time-domain (e.g., time) multiplexed manner. The CM 132 may include one message buffer 178 for each microNOC 142 in its subset of microNOCs 142.

The message manager 180 may communicate messages between the microNOC 142 and the NOC 146. The message manager 180 may monitor bandwidth levels and/or predictive bandwidth allocations to determine that the message buffer 178 has room for a next message to be scheduled and/or a status of a group transaction (e.g., "ready" status or "completed" status). Customer agreements, serve level agreements, or the like, may be stored as accessible data and used to define transmission rates and/or relative allocation of bandwidths. Customer agreements and/or service-level agreements may include performance metrics agreed to by a customer consenting and/or subscribing to different Quality of Service (QoS) parameters. QoS parameters may include a proportion of overall bandwidth allocated to that customer at each scheduling cycle and/or a transmission rate relative to other transmission rates of other customers that may increase a priority of messages corresponding to that customer's application relative to that of the other customers.

Figure 11:
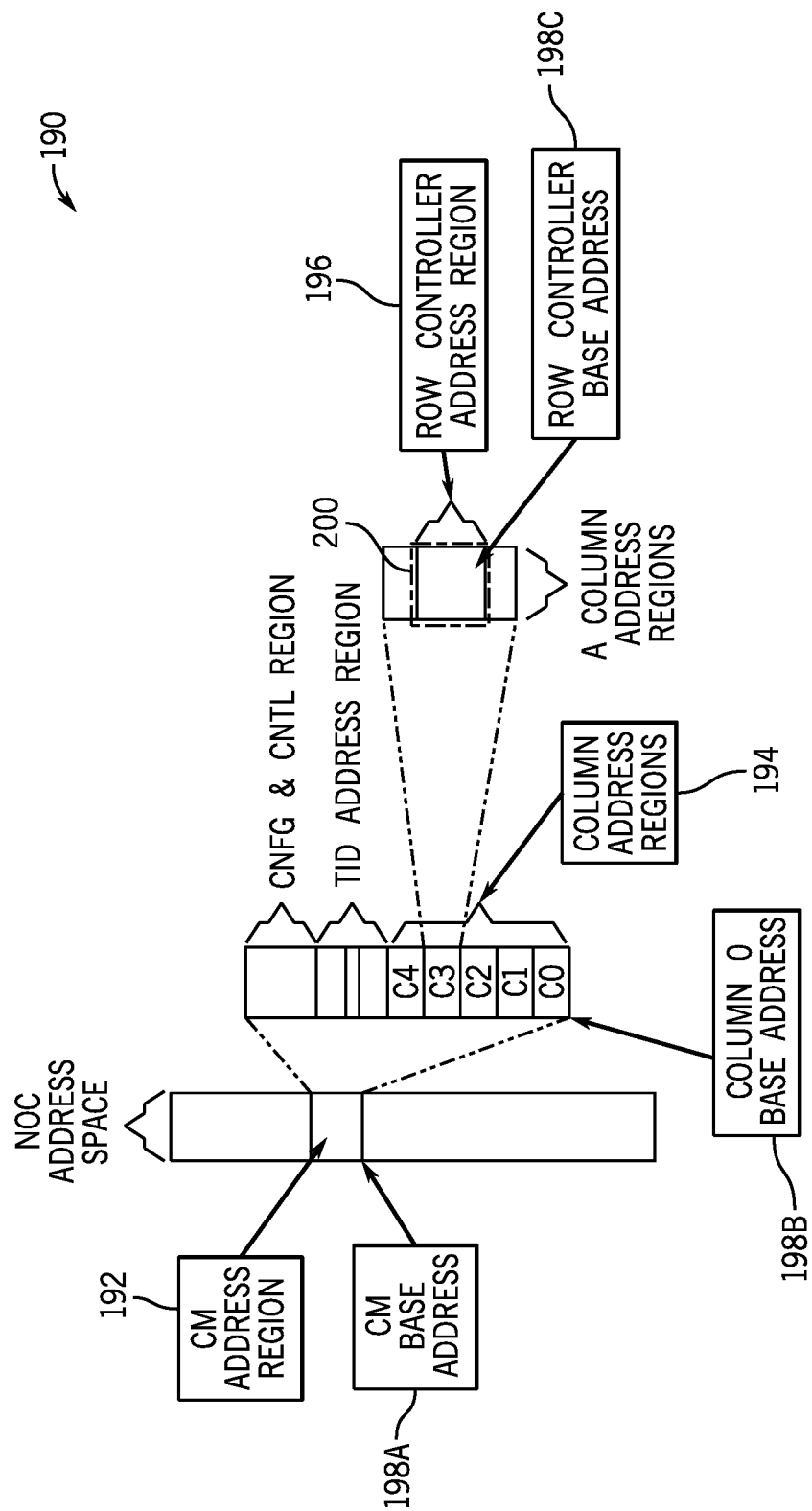
FIG. 11 is an illustration of a logical address space associated with the column manager (CM) of FIG. 10, in accordance with an embodiment.

Elaborating further on these transactions and addressing methods, FIG. 11 is an illustration of a logical address space 190 used by the CMs 132. Each CM 132 may use a respective address for each respective transaction. Addressing may be made at a variety of levels. Devices and/or applications of the integrated circuit 12 may use the same addressing scheme to reference a CM 132 as used to reference a row controller 126. Indeed, the integrated circuit 12 may use a CM address logical region 192, a column address logical region 194, and/or a row controller address logical region 196. The CM address logical region 192 includes addresses used to address any respective CM 132 within the respective region. The column address logical region 194 includes addresses used to address any respective microNOC 142 within the respective region. The row controller address logical region 196 includes addresses used to address any respective row controller 126 within the respective region. Thus, to reference a particular row controller 126, a certain CM 132 is to be identified with an index within the CM address logical region 192, a certain microNOC 142 is to be identified with an index within the column address logical region 194, and from there a certain row controller 126 may be identified with an index within the row controller address logical region 196.

A device of the integrated circuitry may reference a base address and/or an index when addressing a group of devices and/or a specific device the respective regions 192, 194, 196. Indeed, an index may be used when referencing an addresses having an offset from a base address. Various base addresses 198 (198A, 198B, 198C) are visualized in FIG. 11. If a base address is 0, a device may add an offset to the base address using indexing to reference a specific address different from the base address (e.g., 0+3 for 3 indexed from the base address). The address resulting from the offset incrementing the base address value may reference a component corresponding to the indexed position. Generally, this may be referred to as "indexing," that is, the process of indirectly accessing an address value by using a combination of index offsets and base addresses.

A device may also directly address a component at a physical address using a logical address. A direct address may use the specific logical address without an offset from a base address.

The logical address space 190 may be defined independent of physical placement of each row controller 126. But, the logical address space 190 may not be defined independent of a NOC logical-to-physical address translation since the physical placement of each CM 132 may change the relative addressing used to access each CM 132. Addresses for components corresponding to a respective CM 132 may exist independent of the NOC logical-to-physical address translation. The CM 132 may be reached by a logical-to-physical address conversion on a master bridge of the NOC 146, from which commands are executed.

Addressing based on the logical address space 190 may provide a method to directly access respective row controllers 126. Direct access to respective row controllers 126 may enable direct access to the programmable logic 66 corresponding to the respective row controllers 126. Indeed, a command for the base address 198C processed according to the base address 198C may pass to the row controller 126 via an associated portion of the data path 144. It is noted that the addressed row controller 126 and the portion of the data path 144 communicatively coupled to the addressed row controller are at least represented as node 200 and that the node 200 may represent or include other circuitry.

Figure 12:
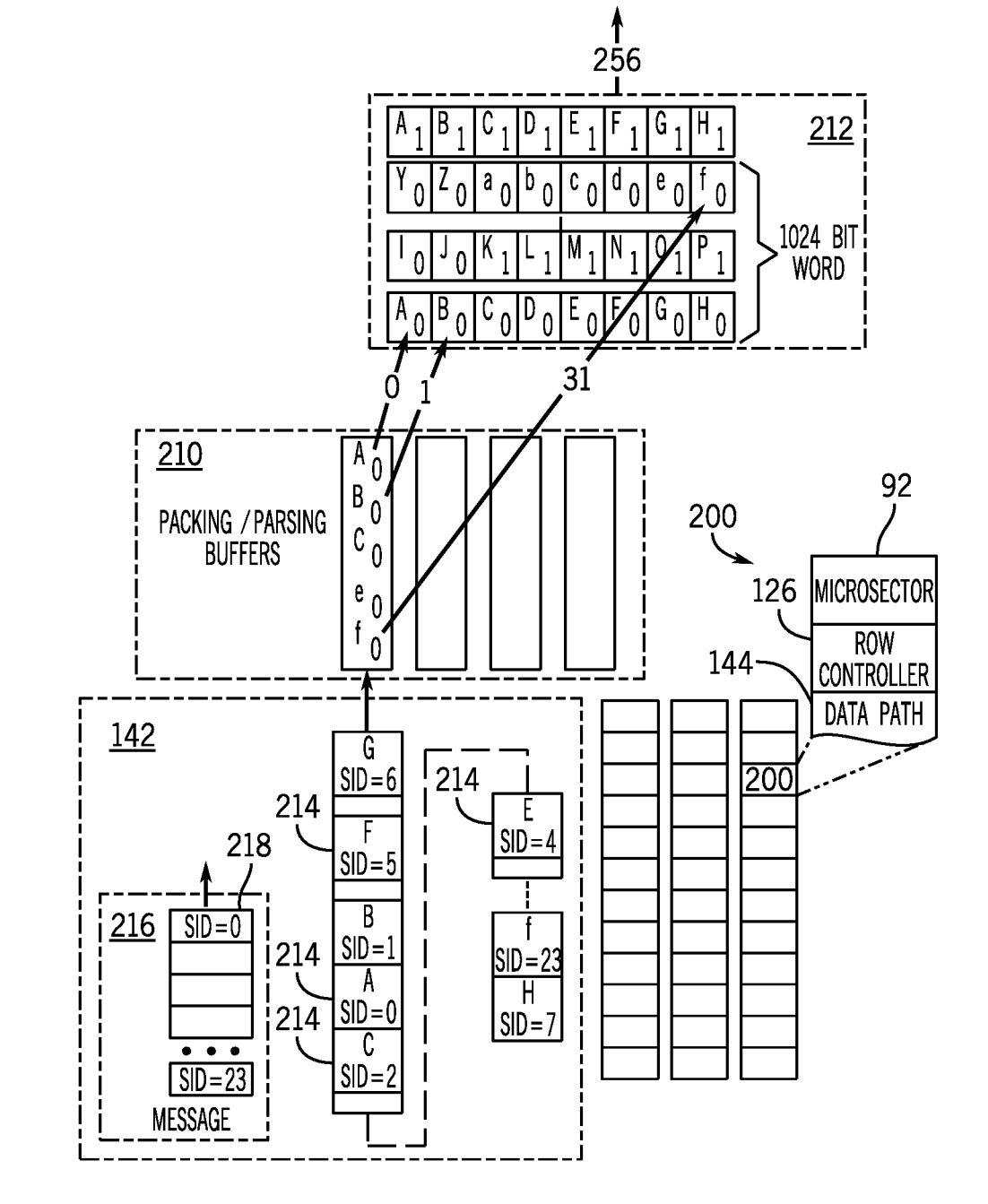
FIG. 12 is an illustration of 1-column data packing that may be used by the column manager (CM) of FIG. 10, in accordance with an embodiment.
Figure 13:
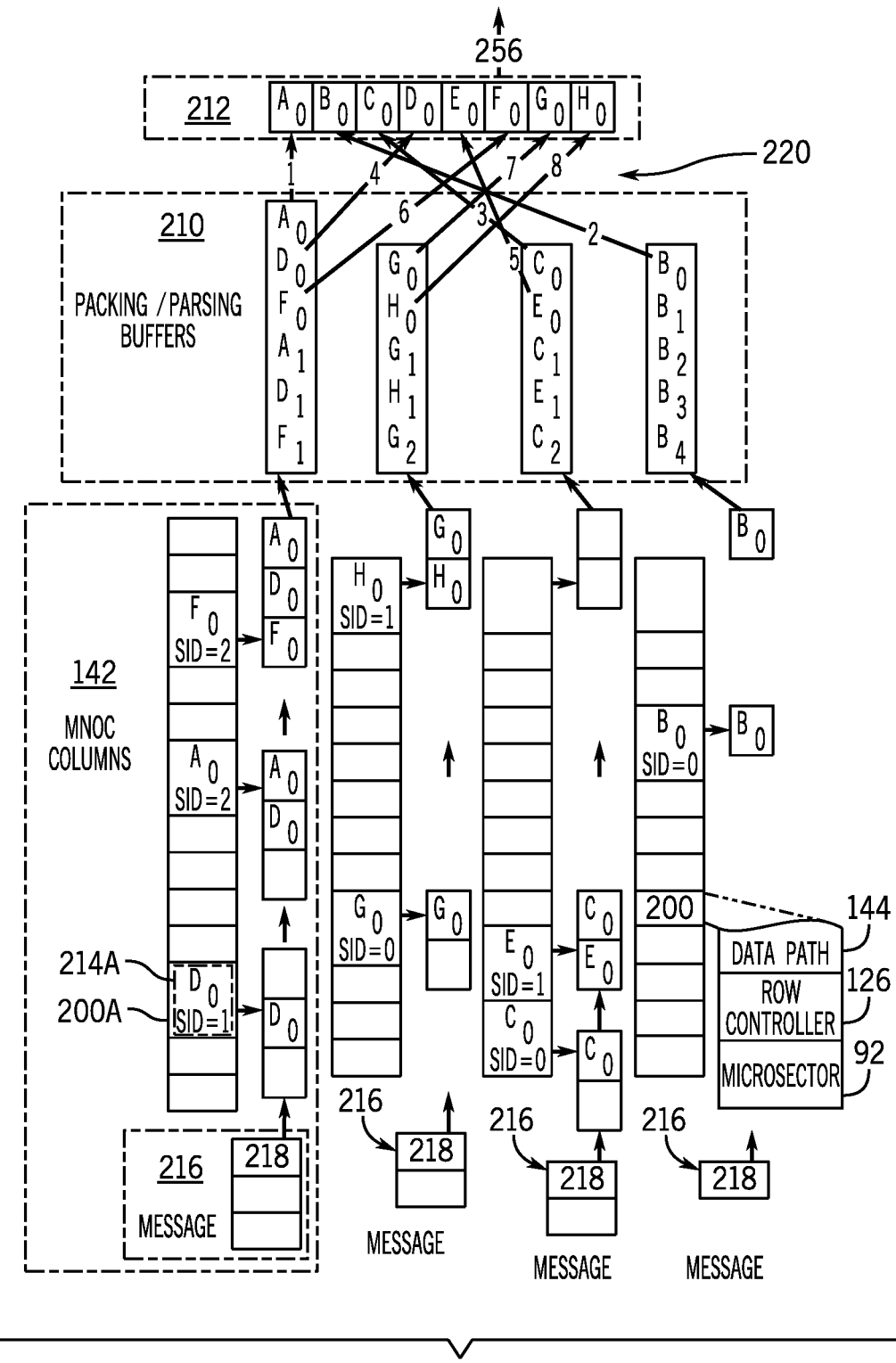
FIG. 13 is an illustration of 4-column data packing that may be used by the column manager (CM) of FIG. 10, in accordance with an embodiment.

Simplified addressing methods may permit data packing to occur over one or more microNOC 142 columns, permitting many different combinations for storing and accessing data within the programmable logic 66. For example, FIG. 12 is an illustration of 1-column data packing and FIG. 13 is an illustration of 4-column data packing. Striping methods may be used to read and write data from the respective row controllers 126 in the "correct" or expected logical order even when stored or loaded out of order.

FIG. 12 and FIG. 13 show a 256 bit word being output (e.g., to an AXI bridge or other suitable output interface to CM 132) using a 256 bit width interface after being converted from a 1024 bit word in RTL. Message 216 traffic moved using the microNOCs 142 travels either up or down the respective microNOC 142. A message 216 has a header and payload. A full payload is called data and any empty portion of the payload are slots that each have the ability to store data. The message 216 is illustrated in FIGS. 12 and 13 is shown as initially having slots, and some of the slots fill with data as the message 216 transmits up a respective microNOC 142. It should be understood that the payload is one example of data included with a message. Indeed, the payload may be appended after a header for the message 216 and/or transaction command bits.

Data sizes used herein are example sizes, and it should be understood that any suitable data interface and storage size ratio may be used. Both FIG. 12 and FIG. 13 illustrate how data that is stored in a different order than a "correct" or expected logical order is still able to accessed in the "correct" or expected logical order when output. For ease of discussion, FIG. 12 and FIG. 13 are discussed together herein. It is noted that each node 200 represents a respective row controller 126, a corresponding portion of the data path 144, and a corresponding microsector 92 (e.g., interface between programmable logic 66 and row controller 126).

A CM 132 may communicate with a microNOC 142 in a streaming data protocol. Messages following the streaming data protocol are communicated on the data path 144, one by one. Each message 216 may be inspected by each row controller 126. As a message 216 traverses into a portion of the data path 144 corresponding to a row controller 126, the row controller inspects a header of the message 216 to determine if the message 216 is for itself. Indeed, the row controller 126 reads an identifier of a message 216. The row controller 126 may receive the message on the data path 144 from the CM 132 or from an upstream portion of the data path 144 (where the arrow showing the path of the message 216 in FIG. 12 shows the direction from which a message may travel on the data path 144 of microNOC 142 making "E" data 214 upstream from the "C" data 214 through the "G" data 214). It is noted that "E" data 214 corresponds to a microsector 92 disposed at a different position (e.g., different position relative to its corresponding microNOC 142 node) that the microsector 92 corresponding to the "C" data 214. When the identifier identifies another row controller 126 as the target end point, the row controller 126 passes the message 216 downstream using the data path 144.

However, when the identifier indicates the row controller 126 as the target end point, the row controller 126 may operate according to a transaction command indicated via the message, and thus may store at least some of the data of the message 216 according to configurations programmed into the row controller 126 (e.g., configurations identified by the message 216 or by a previously received message). If the transaction command indicates a read operation, the row controller 126 may read data from its memory or from the microsector 92 and write the data into a slot 218 of the message 216. The row controller 126 may then return the message to the data path 144.

Since the data path 144 transmits according to a streaming data protocol, the message 216 may transmit to a last row controller 126 of the microNOC 142 column before being returned up to the CM 132. In some cases, the row controller 126 retrieves the data in response to receiving the message 216 a first time (e.g., on a down-direction transmission on the data path 144) and may write the data to a slot 218 of the message 216 in response to receiving the message 216 a second time (e.g., on an up-direction transmission on the data path 144).

Data read from each row controller 126 may be stored in a "correct" or expected logical order in a buffer 210. The CM 132 may use the buffer to pack or parse data of messages 216. The buffer 210 may be any suitable size that reduces or mitigates a start-stop latency from processing back pressure, such as back pressure between register 212 and the buffers 210 or between the microNOC 142 and the buffers 210. The data 214 is stored in the buffers 210 in a retrieval order to be followed at output to the register 212. The register 212 may fill with data over time (e.g., represented by "0" subscript for first-in-time data and the "1" subscript for next-in-time data). The register 212 may be bi-directional, and data may be read from or written to the register 212 based on direction of data flow from the CM 132. It is noted that message buffers 178 may include the buffer 210 and/or the register 212, or the buffer 210 and/or the register 212 may be disposed elsewhere in the system accessible by the CM 132.

Despite data being read from the register 212 in the "correct" or expected logical order, data 214 may be stored in the programmable logic 66 according to a different order. For example, in FIG. 13, "D" data 214A is stored in a bit position equal to 1 of a message 216 but is input first into the message 216. If the data had been stored in the "correct" or expected logical order, the "D" data 214A would have been the second data to be stored in the message 216. Stripe identifiers (SID) associated with each data 214 indicate to a respective row controller 126 which slot to insert the data 214 even when the data is otherwise stored out of order. Since "D" data 214A corresponds to a SID=1, the row controller of node 200A knew to write the "D" data 214A in the second slot 218. Data stored out of order but rearranged in the message 216 using these stripe identifier methods may be output in its "correct" or expected logical order with the message 216 at exit from the microNOCs 142. FIG. 13 shows the SIDs and it is noted that a similar process may be used in the system shown in FIG. 12 to read data 214 via the microNOC 142 (as indicated with use of SIDs with the respective data 214). SIDs may be defined per Traffic Identifier (TID), where the TID is used to identify a respective microNOC 142. The TID may correspond to a logical address of the respective microNOC 142 (e.g., to guide the routing network 154 as to where to direct the message 216).

To elaborate, CMs 132 may use SIDs to identify a slot 218 position in a respective message 216 sent via the data path 144. The identified slot 218 indicates to the row controller 126 within which of the slots 218 to write its read data. The message 216 and its slots with or without data returns to the CM 132. The CM 312 may use the message 216 with data from the row controllers 126 in its processing operations. The stripe identifiers permit a message traveling from top to bottom (or vice versa) in a microNOC 142 column to use logical order as opposed to physical order to organize messages, or to organize data within a message. This reduces, or totally eliminates, reordering buffers to reorder column data before output, and thus may lead to an efficient, lower-cost circuit design relative to other methods that use reordering buffers.

FIG. 12 differs from FIG. 13 in that the data of FIG. 13 is accessed using data striping methods. FIG. 12 shows a word count bandwidth that occurs when all data for the same group is stored in a same microNOC 142 column. Indeed, the data 214 shown in FIG. 12 is of a same group of data and is to be loaded into the same buffer 210 before being output to the registers 212. In contrast, FIG. 13 shows a process for moving data 214 to the register 212 when the data of a same group is stored across different microNOC 142 columns using a data striping processes. Indeed, data 214 is written into the programmable logic 66 based on a read order for the data 214. The read order defines an order that a device follows when reading the data 214 from the buffers 210. The read order arrows 220 show an example read order. The read order arrows 220 highlight how data 214 "$A_0$" may be read before second data 214 "$B_0$" and how the last data 214 read, "$H_0$," may correspond to the eighth read position. In data striping processes, software, CM 132, the compiler 16, the design software 14, the host 18, or the like, may consider this read ordering when determining in which of the microNOCs 142 to write the data 214. For example, data 214 "$A_0$" and data 214 "$B_0$" were stored in memories associated with different microNOCs 142 so that the reading of one may not delay the reading of the other.

Operations illustrated in FIG. 13 may be able to be pipelined more relative to the operations illustrated in FIG. 12. Generally, pipelined operations may lead to operations that have improved throughput and reduced execution times. Since the operations illustrated in FIG. 13 enable pipelined read operations based on the process of striping the data in storage, an integrated circuit 12 using such operations may have similar performance improvements.

Figure 14:
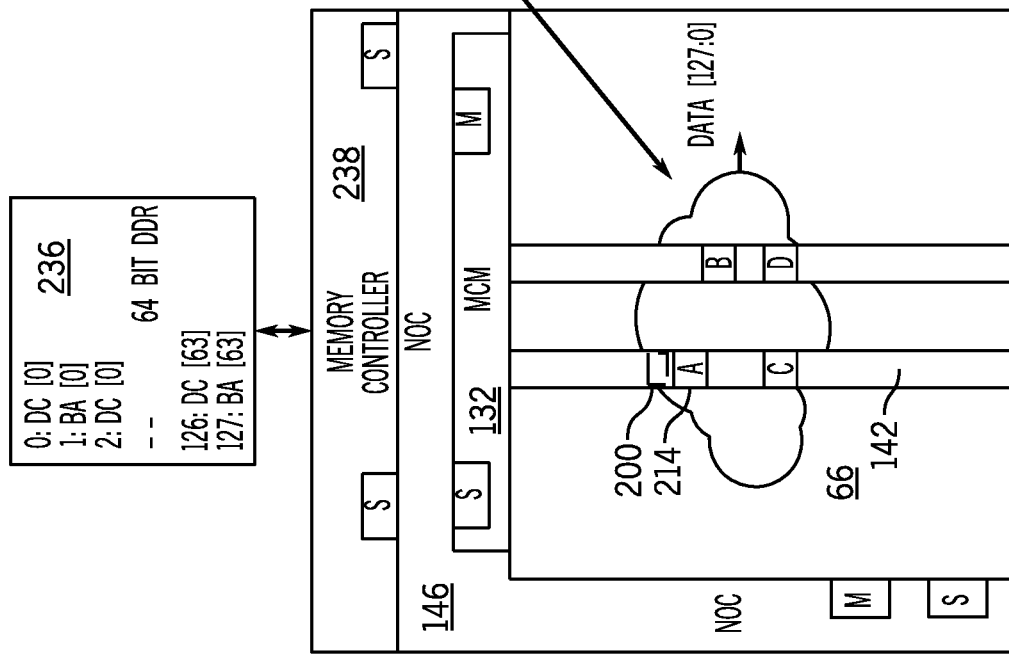
FIG. 14 is an illustration of memory space indexing referenced from a register-transfer level (RTL) design file by the column manager (CM) of FIG. 10, in accordance with an embodiment.

These striping methods may permit extension of a word width from a native width (e.g., 32-40 bits or any base bit width) of a row controller 126 to an arbitrary width formed from a concatenation of data widths of multiple row controllers 126 in a same or different microNOC 142. FIG. 14 illustrates an example of this width extension.

FIG. 14 is an illustration of memory space indexing referenced in a register-transfer level (RTL) design file and the associated data striping implemented by the CM 132. In this example, data from two microNOCs 142 are to have a packed representation in memory 236 with a 128-bit effective data width in RTL using 4 row controllers 126 (e.g., 4 nodes 200). Similar to FIG. 12 and FIG. 13, FIG. 14 also has a logical order used to fetch data from each row controller 126 that is different from a physical order inside a microNOC 142 and between the microNOCs 142. For example, data 214 "B" is stored in a different column than data 214 "A" and after data 214 "D." It is noted that the data 214 may span multiple nodes 200 or be wholly stored within one node 200. The RTL indicates a concatenation of the portions of data 214 (e.g., code 240), and associates the portions of data 214 with a logical read order. The concatenation may permit a larger word to be split up into smaller words for storage via row controllers 126, where the data may be physically stored across the row controllers 126 in any suitable order independent of the logical read order.

Data to be loaded or unloaded into the nodes 200 may come from off-chip memory, such as memory 236. The memory 236 may include any suitable type of memory, such as memory 64, double date rate (DDR) memory, read-only memory, read-write memory, high bandwidth memory, and so on. The memory 236 may also sometimes be memory disposed in another component or device, as opposed to being a dedicated memory device.

Each node 200 of a microNOC 142 may have its own assigned identifiers (MID). Each node 200 of a microNOCs 142 has its own MID, but nodes 200 in different microNOC 142 columns may share a MID. A MID may be assigned to a single row controller 126 or to a group of row controllers 126. The memory controller 238 may use the MID to reference a single row controller 126. For example, including a MID in a message to a target row controller 126 may indicate the target row controller 126, where each row controller 126 has a separate MID. The memory controller 238 may use the MID referencing a group of row controllers 126 to form words between different portions of programmable logic 66, such as a load/unload batch operation, a first-in first-out (FIFO) streaming operation, or the like. When synchronized, the memory controller 238 and/or the CMs 132 may use individually addressed row controllers 126 to perform operations. For example, if the memory controller 238 is to individually access the row controllers 126 synchronized as a group but having respective MIDs, details regarding the synchronization may be provided at the system level, such as during a design phase or with an input to a human machine interface. The memory controller 238 may instruct respective CMs 132 on how to store data and/or on whether or not to use synchronization to form a "wide word" (i.e., stored data spanning multiple storage locations within different nodes 200).

The memory controller 238 may use these batch or batch-like operations to retrieve or store data corresponding to a wide word. When data is moved between multiple nodes 200 that form a wide word, the CM 132 may receive an acknowledgement signal (or indication) when the operation is complete, signaling that data received represents a complete wide word, and thus is final. The CM 132 receives data from the microNOCs 142 in a manner that maintains synchronization between the data from the different nodes 200 that form the wide word. For example, in individual addressing operations, a read operation and/or a write operation may cause a synchronization signal at a node 200 to toggle. This toggling may be used to synchronize completion of respective read operations or write operations at a system level between different row controllers 126. A memory controller 238 and/or the CM 132 may perform a load/unload batch operation, a FIFO batch operation, or system-level synchronized operations between individually-addressed row controllers 126 to write or read a wide word.

One or more row controllers 126 may be referenced using a same MID. Indeed, a CM 132 may use one MID to call to a group of row controllers 126. The CM 132 may use the MID to reference the group of row controllers 126 with a single command, such as when performing batch operations.

An example batch operation includes load and/or unload operations, which may involve relatively large amounts of data being transmitted between programmable logic 66 corresponding to the group of row controllers 126 and a device communicating with one or more CMs 132. When performing a load or unload operation, the CM 132 may instruct that each respective row controller 126 in the targeted group to repeat a similar operation. Load and unload operations may also use synchronization signal toggling to synchronize read or write operations at a system-level. A command completion response from a respective row controller returned to an instigating CM 132 may indicate that associated operations of the group are complete. The command completion response may be generated by a last row controller 126 of the group to perform the operation to indicate the operations of the group are complete. The CM 132 may transmit the command completion response using the NOC 146 to the instigating device (e.g., device that requested performance of the batch command).

ACM 132 may use a shared MID to access a group of row controllers 126 when performing a FIFO batch operation. This mode requires associated row controllers 126 in a group to monitor and control a ready/valid signal to keep themselves in sync. For a read operation, this means tracking a shared ready signal. The ready signal may support ready latency on de-assertion. Indicating on signal de-assertion may help permit pipelining of the ready signal to increase a span of row controllers 126 able to be synchronized. For a write operation, the microNOC 142 determines that each of the row controllers 126 in a group have sufficient and a specific amount of data ready to transfer. Verifying each is ready to transfer data reducing a likelihood of the batch operation desynchronizing at deployment due to some row controllers 126 being ready at a different time. Thus, the microNOC 142 may transfer data to a CM 132 and may keep each row controller 126 logically synchronized with each other during the FIFO batch operation. In some cases, latency savings from data striping may compensate for this intentional delay in moving data with the FIFO batch write operation, making a difference in latency negligible.

To reiterate, individual row controllers 126 are associated with portions of programmable logic 66 and sections of the data path 144 via association to a node 200. Each node 200 in a microNOC 142 is assigned a different MID, and different microNOCs 142 may share a same range of MIDs. This enables references to physical positions of the different nodes 200 at a relative placement in the microNOC 142 column to be the same between microNOC 142 (as the geometry may be constant for the design). MicroNOCs 142 are distinguished from each other using a Traffic Identifier (TID). Start-of-packet codes and end-of-packet codes may be used to demarcate MIDs, TIDs, SIDs, headers, and payloads in respective messages. In some cases, start-of-packet codes and end-of-packet codes just demarcate start/stop of a message and each header, MID, TID, SID, header, and payload is of a consistent and known size each transaction. These codes may be made from data having a different value than data expected to be stored in the payload. Messages (i.e., traffic) designated for transmission on a target microNOC 142 include the TID for the target microNOC 142. For example, SR blocks 152 of FIG. 9 and FIG. 10 may reference the TID to determine whether to turn or pass the message. TIDs may be used to allocate bandwidth and/or manage QoS metrics to a respective node 200 when the bandwidth or QoS metric is not directly implied by a received command (i.e., designating certain microNOC 142 to lower bandwidths or lesser priorities). TID also define striping sets within a column and/or across columns, and may be used to perform data striping shown in FIG. 13.

Indeed, the MID may be used for non-striped data write operations to the nodes 200 and identifying which nodes 200 returned read data after a read operation. The TID may be used for data read operations from the nodes and for striped data write operations. For example, the message 216 of FIG. 12 may include a write command and a MID. When the MID of the message 216 matches the MID of a node 200 (e.g., that assigned to a row controller 126), the node 200 takes data stored in the message 216 from the message 216 and writes the data into its devices. When doing so the row controller 126 may remove the data from the message 216, leaving a slot 218. For a non-striped read operations, if the TID of the message 216 matches a TID assigned to microNOC 142 that includes a node 200, the node 200 (i.e., using the row controller 126) may write its data into the slots 218 of the message 216 and mark the message 216 as taken by writing its MID into the header of the message 216. However, for striped read operations and/or striped write operations, the TID of a message 216 identifies which nodes 200 should respond to the message and a SID defines which slot in the message 216 belongs to that node 200. Following these processes may permit a CM 132 to control each bandwidth allocation and QoS metric on the microNOC 142 by generating sets of messages that allocate resources (e.g., bandwidth) as desired and/or as defined by QoS agreements.

A user may directly instantiate a row controller 126 in an RTL, and may infer instantiation of a row controller 126 through memory constructs available in RTL, such as through a MID (or a TID) referencing a subset of row controllers 126 (and thus nodes 200). This may include RTLs generated from higher level languages, such as OPENCL® or languages used during high-level synthesis (HLS) operations. This memory may be considered a logical memory in the programmable logic 66 in that it has not been placed yet into a physical location. The physical node 200 that ends up being used for the row controller 126 is a choice that the design software 14 and/or compiler 16 makes when placing a design during the compilation to generate a configuration bitstream.

Figure 15:
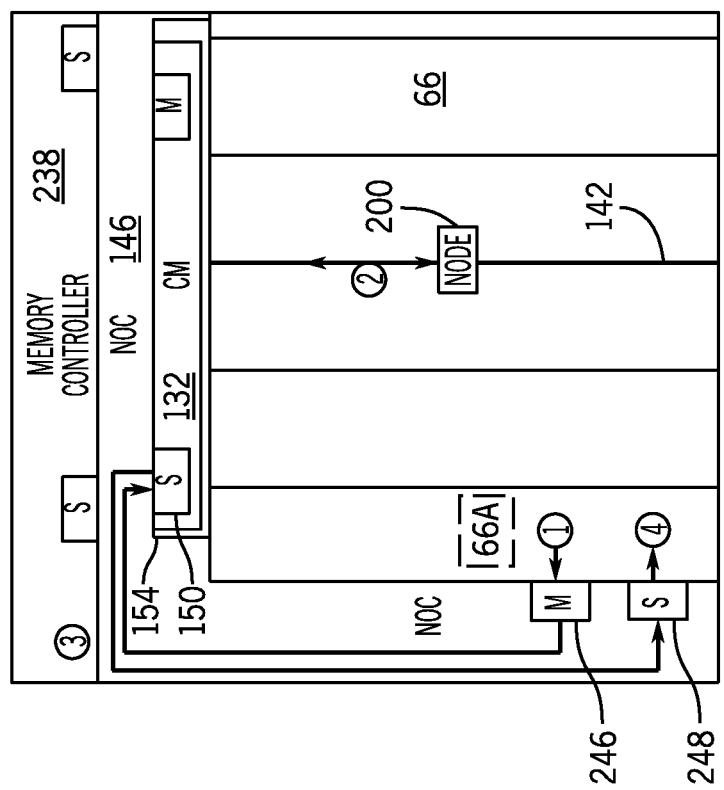
FIG. 15 is an illustration of a first example memory operation performed by the column manager (CM) of FIG. 10, in accordance with an embodiment.

Referring now to more details regarding direct addressing operations, FIG. 15 is an illustration of a first example memory operation. In this example, a target node 200 is addressed by a command generated by a portion of programmable logic 66A different from that corresponding to the target node 200. A command from an inquiring device may address the target node 200, or one or more other target nodes 200, following a similar method. Furthermore, although these operations are described as being performed by the CM 132, any suitable processor may perform some or all of the operations, such as the memory controller 238 and/or another CM 132.

As described above, each enabled row controller 126 (e.g., corresponding to a respective enabled node 200) has an address in a global address space of the integrated circuit 12. The address may include or associate to a combination of a MID and a TID identifying a placement of the row controller 126 within a particular microNOC 142.

Read operations and/or write operations may follow a process that starts with a device issuing a read command or a write command on any interface bridge (AXI bridge). In this example, programmable logic 66A generates a read command or write command (e.g., at operation "1"). For ease of disclosure, read commands and/or write commands are generalized as "access commands." The CM 132 may receive the issued access command from the NOC 146 and may perform the specified operation in the issued access command (e.g., at operation "2"). The generated message may include a TID and MID to guide transmission through the routing network 154 to the targeted node 200. Once the message is on the microNOC 142 (e.g., transmitting via data path 144), the addressed node 200 identifies the message as its own, and may retrieve data from the message 216 or write data to the message 216 based on the type of transaction instructed by the access command. The addressed node 200 may return the modified message to the microNOC 142. When the CM 132 receives message or an acknowledgement signal, the CM 132 returns the transaction result to a slave interface 248 via the NOC 146 (e.g., at operation "3"). The slave interface 248 passes the transaction result to the programmable logic 66, which eventually transmits the transaction result, a transaction completion message or confirmation, or both, to the requesting master entity, the programmable logic 66A (e.g., at operation "4"). For example, when the requesting master entity is an AXI master, the transaction completion message or confirmation returned to the requesting master entity includes or is an AXI transaction completion message.

Direct addressing operations may sometimes use a visible handshake between the CM 132 and the node 200 to signal different processes (e.g., ready signals, acknowledgment signals) of the direct addressing operation. Furthermore, direct addressing operations may sometimes use an acknowledgment signal that toggles each time a transaction completes for a node 200. This signal toggling may be used to track, for example, system usage rates to guide future design decisions. For example, software may compare system usage rates reduce a likelihood of over-programing and/or overusing one region of programmable logic 66 over another by making one or more design decisions based on the system usage rates. It is also noted that a transaction size may be defined by a size of the interface requesting the transaction. In this case, the transaction size may equal a data width of the master interface 246 and/or the slave interface 248. However, in other cases, other data widths may be used based on the requesting circuit or application (e.g., requesting master).

Figure 17:
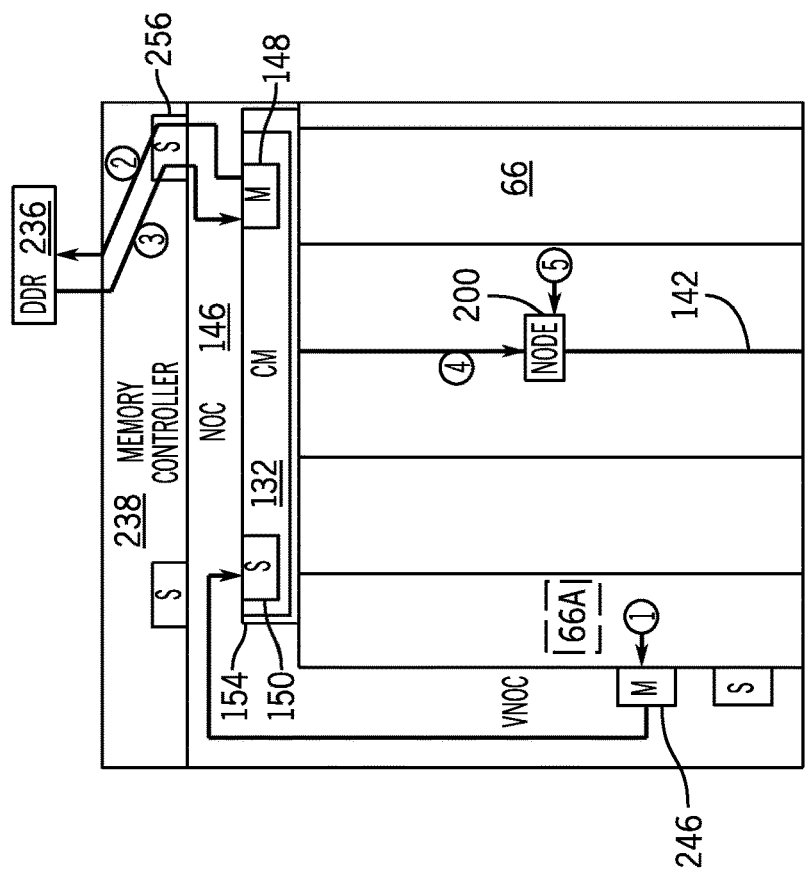
FIG. 17 is an illustration of a third example memory operation performed by the column manager (CM) of FIG. 10, in accordance with an embodiment.
Figure 16:
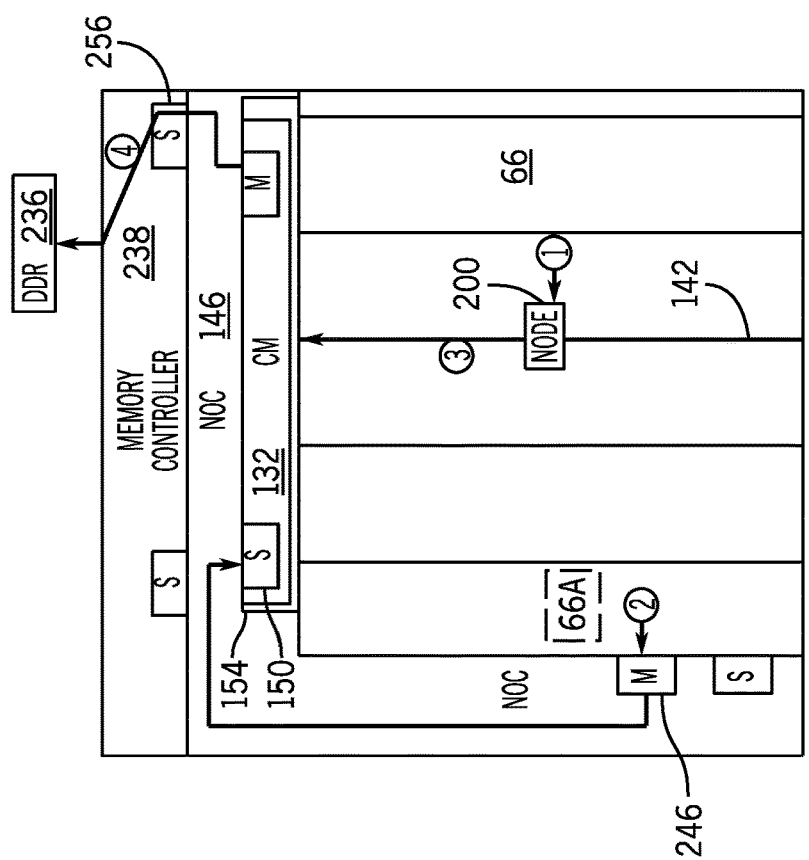
FIG. 16 is an illustration of a second example memory operation performed by the column manager (CM) of FIG. 10, in accordance with an embodiment.

Referring now to more details regarding load/unload operations, FIG. 16 is an illustration of an example unload operation and FIG. 17 is an example of a load operation. Load/unload operations may load or unload one or more nodes 200. Examples include moving data in or out of one or more nodes 200 corresponding to weights for AI calculations, corresponding to constants used for Signal Processing, corresponding to marshalled or un-marshalled data for OPENCL® calculations, and the like. Data to be loaded or unloaded into the nodes 200 may come from off-chip memory, such as memory 236. The memory 236 may include any suitable type of memory, such as memory 64, double date rate (DDR) memory, read-only memory, read-write memory, high bandwidth memory, and so on. The memory 236 may also sometimes be memory disposed in another component or device, as opposed to being a dedicated memory device. The data for unloading may also come from (e.g., be accessed from) any addressable interface, such as a slave interface. This may include soft logic slaves, one or more processors, or any suitable data-generating component. It is noted that the microNOCs 142 may also move data between one or more nodes 200 on a same chip.

Load and unload operations may use command and handshake processes since the operations cause an exchange of blocks of data between an endpoint and one or more specified nodes 200 via one or more CMs 132. A command may be considered complete when another device may access the moved data, such as a requesting portion of programmable logic 66, a master device, a device communicatively coupled to the NOC 146 or the memory 236).

Referring now to FIG. 16, an ongoing transaction between the CM 132 and a target node 200 of a command from the programmable logic 66A may complete before the CM 132 issues a message corresponding to the command. Generally, when an operation is ongoing, the CM 132 permits the ongoing operation to complete before issuing a conflicting operation. Any command from any master, inquiring device may address the one or more target nodes 200 following a similar method. Furthermore, although these operations are described as being performed by the CM 132, any suitable processor may perform some or all of the operations, such as the memory controller 238 and/or another CM 132.

To elaborate on unload operations, a CM 132 may write data into the target node 200 using soft logic transactions in accordance with direct addressing operations described with FIG. 15 (e.g., at operation "1"). This may be an ongoing transaction when the programmable logic 66A issues an unload command to the master interface 246 (e.g., at operation "2"). The command generated by the programmable logic 66A may be a write command to control registers of the slave interface 150, and the command may include parameters describing which node is the target of the microNOC 142, an address range of a slave device to which the data is to be moved to from the target node 200, and a size of the transaction. The CM 132 may reference the parameters and any internal message protocols to retrieve data from the target node 200(e.g., at operation "3"). As described herein, the fetching of the CM 132 may involve retrieving data striped across multiple nodes 200 and/or multiple microNOCs 142, may involve toggling a signal from the row controller 126 of the node 200 into the programmable logic 66 of the node 200 at end of transaction, may involve waiting to transmit a confirmation signal to the master interface 246 until the command is complete, or the like. The CM 132 may issue results from read transactions (i.e., reading data from the target node(s) 200) as a write transaction to a slave interface 256 based on the parameters (e.g., at operation "4"). The slave interface 256 may transmit the write transaction for implementation to memory 236. If more transactions are received by the CM 132 than a rate of execution of the transactions by the CM 132, the command queue 174 in each respective CM 132 may queue one or more outstanding transactions.

Referring now to FIG. 17, the same CM 132 of FIG. 16 coordinating a load operation. Recitations are relied upon herein from FIG. 16 to describe the load operation. Similar to unload operations, user logic and/or a function programmed into the programmable logic 66A may generate a command instructing the load operation (e.g., at operation "1"). The command generated by the programmable logic 66A may be a write command to control registers of the slave interface 150, and the command may include parameters describing which node is the target of the microNOC 142, an address range of a slave device to which the data is to be moved to from the target node 200, and a size of the transaction. In some cases, interface circuitry of the NOC 146 may inspect the write command from the master interface 246 to determine the CM 132 corresponding to the target nodes 200. Based on the determined CM 132, the NOC 146 routes the write command to the slave interface 150. This write command may be considered a load command. The CM 132 receives the write command at the slave interface 150 and inspects the write command to determine off-chip memory addresses. The CM 132 may issue an off-chip memory read command to the slave interface 256 via the NOC 146 to request return of data specified by the off-chip memory addresses indicated by the write command. (e.g., at operation "2").

The NOC 146 routes the returned data from the slave interface 256 to the master interface 148 to provide the CM 132 with the returned data (e.g., at operation "3"). The CM 132 transmits the returned data to the target nodes 200 based on parameters specified in the slave interface 150 (from the original load command) and/or internal message protocols (e.g., at operation "4"). As described herein, the CM 132 may read data striped across multiple target nodes 200 and/or multiple microNOCs 142. Reading of striped data may involve toggling a signal from the row controller 126 of the target nodes 200 into the programmable logic 66 of the target nodes 200 at end of transaction, may involve waiting to transmit a confirmation signal to the master interface 246 until the command is complete, or the like. Once the load command has completed for each referenced target node 200, other devices or operations may use the loaded data stored in the target nodes 200 (e.g., at operation "5"). As noted earlier, the command queue 174 in each respective CM 132 may queue one or more outstanding transactions.

Figure 19:
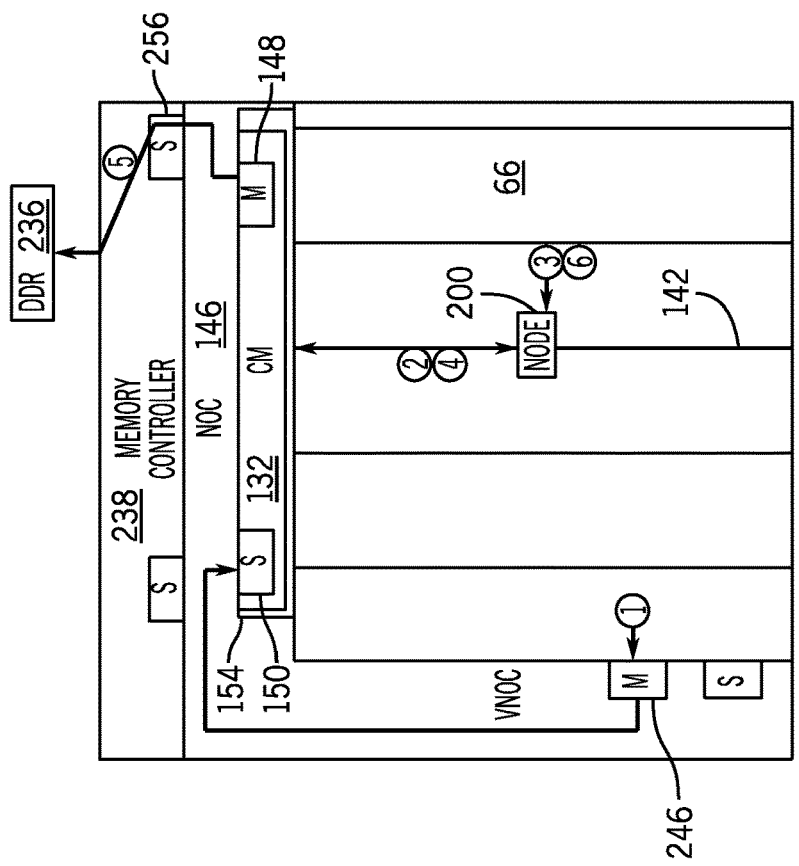
FIG. 19 is an illustration of a fifth example memory operation performed by the column manager (CM) of FIG. 10, in accordance with an embodiment.
Figure 18:
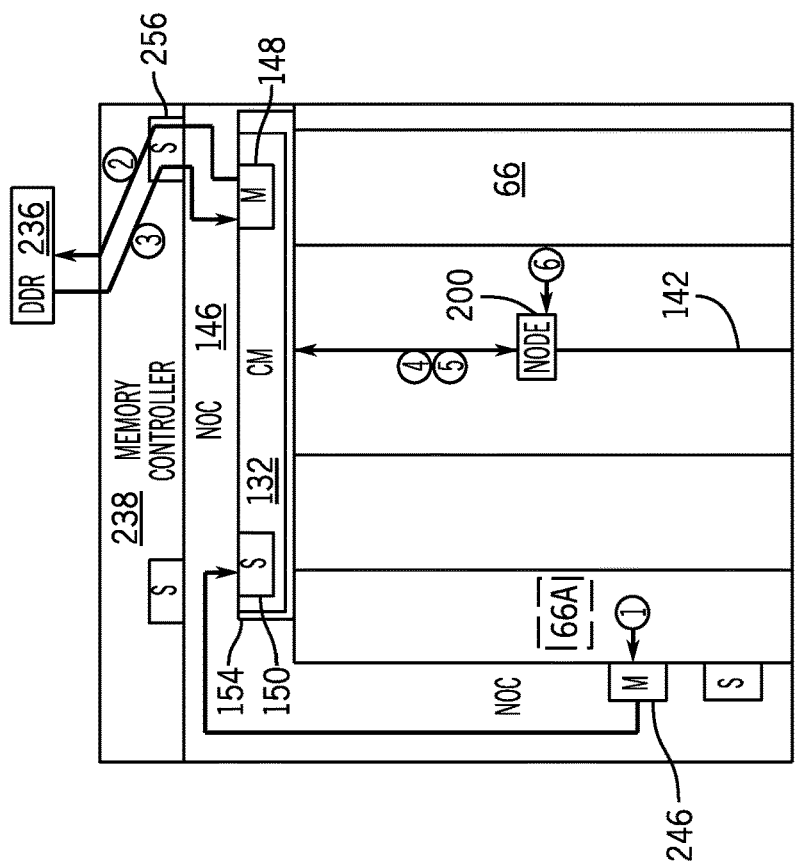
FIG. 18 is an illustration of a fourth example memory operation performed by the column manager (CM) of FIG. 10, in accordance with an embodiment.

Referring now to more details regarding FIFO read/write operations, FIG. 18 is an illustration of an example FIFO read operation and FIG. 19 is an example FIFO write operation. FIFO read/write operations may be similar to load/unload operations except that data is continuously streamed between one or more target nodes 200 and a slave device, such as memory 236, instead of a block of data. One difference between the two types of operations is that the target nodes 200 may act like an input FIFO and/or like an output FIFO with ready/valid signals.

Referring now to FIG. 18, one or more target nodes 200 are addressed by a message from the CM 132 before being instructed to read data from memory 236 via the CM 132. A command from an inquiring device may address the target node 200, or another target node 200 (or group of nodes 200) following a similar method. Furthermore, although some of these operations are described as being performed by the CM 132, any suitable processor may perform some or all of the operations, such as the memory controller 238 and/or another CM 132.

To elaborate on unload operations, programmable logic 66A may issue an FIFO read command to the master interface 246. The command generated by the programmable logic 66A may be a write command to control registers of the slave interface 150, and the command may include parameters describing which node is the target of the microNOC 142, an address range of a slave device to which the data is to be moved to from the target node 200, and a size of the transaction (e.g., at operation "1"). The CM 132 may reference the parameters and any internal message protocols to retrieve data from a target destination, in this case memory addresses of the memory 236. The CM 132 may do so by transmitting a command via the NOC 146 accessing the command at the master interface 148.

The NOC 146 may pass the command from the master interface 148 to the slave interface 256 (e.g., at operation 2"). The memory 236 may return the requested data at the slave interface 256, and the NOC 146 may pass the data from the slave interface 256 to the master interface 148 of the CM 132 (e.g., at operation "3"). The CM 132 may initiated the target nodes 200 to respectively issue credits (e.g., a monitored credit level) representing respectively available space in each of the target nodes 200. The CM 132 may transmit a first portion of the data to the target nodes 200 as a way to test the transmission before sending all of the data form the memory 236. (e.g., at operation "4"). One or more of the target nodes 200 may assert a valid signal to indicate successful initial transmission of the first portion data to the CM 132 (e.g., at operation "5"). Responsive to the valid signal, the CM 132 proceeds to exchange data between the target nodes 200 and the memory 236 (e.g., at operation "6"). This FIFO read mode may continue until the CM 132 is instructed to terminate the operation, until a timer expires tracking the execution of the operation, until the target nodes 200 exhaust of the credits, or the like, at which time the FIFO read operation stops or is paused (e.g., while additional credits are added to the credit level for the target nodes 200). The command queue 174 in each respective CM 132 may permit continuous complex data movement patterns.

Referring now to FIG. 19, one or more target nodes 200 are addressed by a command from the CM 132 before being instructed to load its data to memory 236 via the CM 132. Many of the operations of FIG. 19 are similar to those in FIG. 18 but in a reverse order. Recitations are relied upon herein from FIG. 18 to discuss FIG. 19.

Indeed, the programmable logic 66A may issue a FIFO write command to the master interface 246 (e.g., at operation "1"). The FIFO write command may include parameters to be loaded into the slave interface 150 similar to those described at operation "1" of FIG. 18. In response to receiving the FIFO write command at the slave interface 150, the CM 132 may issue credits (e.g., increase a credit level, assign a credit level) to the target nodes 200 corresponding to available space in the message buffer (e.g., message buffer 178 of FIG. 10). When ready to receive data, the target nodes may assert a ready signal (e.g., at operation "2"). User logic and/or an application may write data into the target nodes by asserting a valid signal while the ready signal is asserted (e.g., at operation "3"). While doing so, the target nodes 200 may send credited node data (i.e., the data specified via the FIFO write command) to the CM 132 (e.g., at operation "4"). The CM 132 receives and passes the credited node data to the memory 236 via the interfaces 148 and 256 (e.g., at operation "5"). The credited node data may be stored at target addresses specified in the original write command from operation "1," though it is noted that the memory controller 238 may translate or redirect between the original target addresses and an actual storage location. This data exchange continues until either the target node 200 FIFO is near full and/or until a defined data size in the original write command exhausts. The CM 132 may determine the defined data size is exhausted when the CM 132 reaches a threshold count level of transactions set by a parameter of the original write command from programmable logic 66A (e.g., at operation "6"). The command queue 174 in each respective CM 132 may permit continuous complex data movement patterns.

Although FIGS. 15-19 describe programmable logic 66A generating a transaction request, it should be understood that any device hardware and/or software, such as soft logic, hard logic or hard processor system (HPS), and/or PCIe, may sometimes generate access commands. One example may be a driver executing on the HPS, and another example may be an Accelerator Functional Unit (AFU) loading neural network weights into target nodes 200 from one or more memories. Commands generated outside of the programmable logic 66A may reference one or more CMs 132, one or more microNOCs 142, one or more row controllers 126, or the like using the addressing space of FIG. 11.

Moreover, although FIGS. 15-19 describe direct addressing and batch addressing operations performed by one or more CMs 132, the CMs 132 may perform other operations as well. For example, a CM 132 may pad out commands to a different word size or remove padding from a command to make it compatible with a protocol used by the row controllers 126. The CM 132 may operate in response to commands from the memory controller 238, which may include information like an indication to pad a command with extra bits, a command type, status and control bits for the operation instructed by the command, a data transfer size (e.g., quantity of bits to permit to transmit during a batch operation), and a buffer address of a destination to send the operation result. The data transfer size may define the length of the transaction in words, and may be equal to a number of row controllers 126 in a group when the command is instructing a batch operation.

The systems and methods described herein may be used with a single customer application or with multiple customer applications. For example, multiple customers may have respective designs programmed in the programmable logic 66. Devices of the integrated circuit 12, such as the NOC 146, memory controller 238, and CMs 132, in these cases, may work balance transactions for each of the multiple customers. Indeed, the multiple customers may have equal bandwidth allocations, and a transaction scheduling protocol using a round robin scheduling approach equally pulling transactions for each customer may work.

However, the case may arise where different customers pay for different bandwidths. To manage scheduling of transactions for customers with one or more different assigned bandwidths, the CM 132 may include one or more credit levels. The credit level may represent an allocated bandwidth for the CM 132, for a microNOC 142, for a row controller 126, or any combination thereof. A controller of the integrated circuit 12, such as the memory controller 238, may allocate transaction credits to the CM 132 and, in response to the allocation, the CM 132 may increase one or more of the credit levels using the allocated credits. These credits may be indications of credits, such a digital representation of a value indicative of a credit level. The CM 132 may reference the credit levels when scheduling transactions with target nodes 200 to help control back pressures. This may permit the data to move between the slave device and the target nodes 200 with end-to-end flow control. It is noted that as described herein, the CM 132 may use the message manager 180 to monitor bandwidth levels and/or predictive bandwidth allocations to determine that the message buffer 178 has room for a next message to be scheduled and/or a status of a group transaction (e.g., "ready" status or "completed" status). The bandwidth levels monitored by the message manager 180 may include or be the credit levels. In this way, a value of a credit level may represent a proportion of overall bandwidth allocated to that customer corresponding to the credit level (i.e., the row controllers 126, nodes 200, microNOCs 142, CMs 132 assigned to the customer). The proportion of overall bandwidth allocations may determine how much bandwidth is assigned at each scheduling cycle to the credit level. The proportion of overall bandwidth allocations may also set a transmission rate relative to other transmission rates of other customers to increase or decrease a priority of messages corresponding to that customer's application relative to that of the other customers.

In some cases, a message 216 may include a broadcasted and/or multicasted command. In this way, one or more nodes 200 may respond to the command of the message 216. For example, configurations being deployed to a group of nodes 200 under one MID, an entire microNOC 142, or the like may be broadcast via a same message 216.

A message 216 may include an indication to cause performance of a cold or warm reset (e.g., a cold reset and/or a warm reset signal is also sent with the data in a message 216). A cold reset takes logic at each endpoint addressed via the message 216 (e.g., a node 200 via MID, a group of nodes via a MID, a microNOC column via a TID) to the reset state. The reset nodes 200 may be reconfiguration after a cold reset. A warm reset resets enough logic in the nodes 200 to verify messages 216 to the nodes 200 are desirably functioning. Metrics may be monitored during a warm reset to verify performances, such as total time to complete operation, latency, backlogging, or the like. A warm reset may not affect user data contents in memory of the row controller 126 and/or contents stored in the programmable logic 66 and a cold reset may clear use data contents of the row controllers 126 and/or of the node 200. Warm reset may cause a re-elaboration and/or re-initialization of the microNOC 142, such as to adjust operations of the microNOC 142 in response to determining from the warm rest that the microNOC 142 is not operating as desired.

In some systems, a configuration bitstream may program a microNOC 142 and microsector-supporting architecture into the programmable logic 66A. Some systems may have the CMs 132 assign identifiers to components at power-on and/or initialization. This may incorporate changes in a number of row controllers 126 and/or a number of microNOCs 142 assigned to one or more CMs 132 between configuration bitstreams loaded into the integrated circuit 12 over time, increasing flexibility of the architecture and permitting redesigns. To do so, when the integrated circuit 12 is powered on, each respective CM 132 walks up each node 200, assigning each node 200 a respective MID for that microNOC 142. Sometimes an elaborate message may be used to selectively assign a MID to an unlabeled node 200. The CM 132 may transmit an elaborate message. Each node 200 may see the elaborate message and pass the elaborate on if the node 200 had already been elaborated or had already been assigned a MID. Eventually, the elaborate message is received by the node 200 that lacks an MID and that has not yet been elaborated. This node will assume the MID indicated by the elaborate message. The elaborate message illustrates a process the CM 132 may use to assign MIDs to nodes 200. Indeed, at startup, each node may have not yet been elaborated and thus may lack a MID, but the CM 132 may assign respective MIDs to each node by sequentially outputting elaborate messages to each of the nodes.

A size of each message buffer 178 may be determined based on an arrangement of the microNOCs 142. Indeed, when determining a size for the respective message buffers 178, the design software 14, compiler 16, and/or host 18 may consider a maximum or likely number of outstanding transactions between a respective microNOC 142 and the CM 132A that may occur at any one time. The size of each message buffer 178 may be selected to accommodate the maximum or the expected number of outstanding transactions.

Referring briefly to design and compilation operations, a compiler 16, host 18, and/or design software 14 may know which register-transfer level (RTL) soft logic is used to implement circuitry applications in the programmable logic 66. The compiler 16, the host 18, and/or the design software 14 may use this information to configure a master bridge of the NOC 146 with identifiers for used row controllers 126 and/or microNOCs 142. The compiler 16, the host 18, and/or the design software 14 may also use this information to generate a name to use to address the include file. At the time the RTL is written, the design software 14, for example, may use placeholder blocks with defined data sources and data end points but without defined memories and logic placement. During compilation, an "include file" may be generated that includes memories and logic placement to implement the operations to be performed by the placeholder blocks. An include file may include one or more named associations between logical memory inferenced (or instantiated in RTL) and addresses. The compiler 16, the host 18, and/or the design software 14 may generate the include file in an RTL analyze phase of compilation operations. For example, the include file may be generated when defining a memory map to guide future memory transactions with the programmable logic 66. The master bridge of the NOC 146 supporting the command interface may provide translation to the physical CM 132. The include file may provide the logical address of the CM 132. The compiler 16, the host 18, and/or the design software 14 may generate a NOC logical-to-physical address translation table after design fitting operations, and may store the translation table in the master bridge as part of device configurations.

During a design phase, a visualization tool associated with the design software 14 may show physical placement of the row controllers 126 in a design. The visualization tool may also show an impact on timing that the row controller placement has on the design, as well as an expected bandwidth or latency. The timing, bandwidth, and/or latency metrics may be shown for the design as a whole, for portions of the design in comparison to each other, or the like. With the visualization tool, a user may perform manual placement of row controllers 126 to determine an impact of the placement. The impact of the placement may not be reflected in the presented metrics until after a re-compilation of the design.

While the embodiments set forth in the present disclosure may be susceptible to various modifications and alternative forms, specific embodiments have been shown by way of example in the drawings and have been described in detail herein. For example, any suitable combination of the embodiments and/or techniques described herein may be implemented. Moreover, any suitable combination of number formats (e.g., single-precision floating-point, half-precision floating-point, bfloat16, extended precision and/or the like) may be used. Further, each DSP circuitry and/or DSP architecture may include any suitable number of elements (e.g., adders, multipliers 64, routing, and/or the like). Accordingly, it should be understood that the disclosure is not intended to be limited to the particular forms disclosed. The disclosure is to cover all modifications, equivalents, and alternatives falling within the spirit and scope of the disclosure as defined by the following appended claims.

Technical effects of the present disclosure include system and methods that provide a microsector architecture. The microsector architecture described herein may benefit operations of programmable logic devices, such as field programmable gate arrays and/or other configurable devices, by permitting programming of programmable fabric to occur over smaller regions of fabric. The systems and methods described herein may enable a 1-bit wide data register (e.g., a micro-data register (μDR)) to transmit data to or from the smaller regions of programmable fabric. Benefits afforded from the microsector architecture may be further improved from using a micro-network-on-chip (microNOC) in conjunctions with the microsector. Each microsector corresponds to a row controller, and row controllers communicate with a control system via a shared data path. The control system may improve data transactions within the microsector architecture by coordinating data read and write operations across one or more microNOCs and across one or more row controllers. Coordinating operations spanning the microsector architecture enables large-scale data movements between the memory within the microsector architecture components and external memory. Furthermore, an addressing process is described herein that enables each row controller and/or each microNOC to be respectively addressed. These system and methods that enable individualized addressing of microNOCs may improve data handling operations since data may be stored out of logical order within the microsector architecture.

EXAMPLE EMBODIMENTS

EXAMPLE EMBODIMENT 1. An integrated circuit, comprising:
a first network-on-chip disposed around at least a partial perimeter of a plurality of microsectors arranged in a row and column grid, wherein the plurality of microsectors comprises a first microsector communicatively coupled to a first row controller; and
a controller configured transmit a command and first data from a second row controller to the first row controller using a second network-on-chip, down a column of rows, wherein the first row controller is configured to perform an operation in response to the command using the first data and is configured to return second data to the controller using the second network-on-chip when the operation causes generation of the second data.

EXAMPLE EMBODIMENT 2. The integrated circuit of example embodiment 1, wherein the plurality of microsectors comprises a second microsector disposed at a different position within the row and column grid than the first microsector, and wherein the first row controller is configured to program the first microsector at least partially in parallel with the second row controller programming the second microsector.

EXAMPLE EMBODIMENT 3. The integrated circuit of example embodiment 1, wherein the second network-on-chip comprises a data path characterized by a same data width as a routing block of the controller.

EXAMPLE EMBODIMENT 4. The integrated circuit of example embodiment 1, comprising a third row controller disposed below the first row controller, wherein the third row controller and the first row controller are coupled to a shared data path, and wherein the first row controller is configured to access the command transmitted via the shared data path before the second row controller is permitted to access the command.

EXAMPLE EMBODIMENT 5. The integrated circuit of example embodiment 1, wherein a streaming data packet comprises the command and the first data, and wherein the streaming data packet comprises the command as part of a header.

EXAMPLE EMBODIMENT 6. The integrated circuit of example embodiment 5, wherein the first row controller is configured to:
determine that the header matches at least a portion of an identifier associated with the first row controller; and
shift the streaming data packet from a shared data path to stop transmission of the streaming data packet via the shared data path.

EXAMPLE EMBODIMENT 7. The integrated circuit of example embodiment 5, wherein the header comprises an indication of the first row controller.

EXAMPLE EMBODIMENT 8. The integrated circuit of example embodiment 1, wherein the first microsector comprises a plurality of logic access blocks each coupled to a data register.

EXAMPLE EMBODIMENT 9. The integrated circuit of example embodiment 8, wherein the data register comprises a 1-bit wide data path, a first flip-flop, and a second flip-flop, and wherein the 1-bit wide data path couples between the first flip-flop and the second flip-flop.

EXAMPLE EMBODIMENT 10. A method, comprising:
receiving an access command from a portion of programmable logic circuitry;
determining a target node specified in the access command;
determining a target micro-network-on-chip column using the target node;
generating a message to cause reading or writing data associated with the target node, wherein the message comprises a first identifier for a target micro-network-on-chip column comprising the target node; and
outputting the message to routing fabric configured to either pass or turn the message based on the first identifier.

EXAMPLE EMBODIMENT 11. The method of example embodiment 10, comprising:
determining a parameter from the access command; and
determining the target node from the parameter.

EXAMPLE EMBODIMENT 12. The method of example embodiment 10, comprising:
generating the message to comprise a second identifier for the target node, wherein each node between the target node and a first node of the target micro-network-on-chip column determines whether the second identifier of the message matches their own identifier.

EXAMPLE EMBODIMENT 13. The method of example embodiment 11, receiving the message from a routing network, wherein the message comprises requested data previously stored in the target node before the target node inserted the requested data into the message.

EXAMPLE EMBODIMENT 14. The method of example embodiment 13, receiving a toggled acknowledgement signal in response to the target node inserting the requested data into the message.

EXAMPLE EMBODIMENT 15. A system, comprising:
programmable logic circuitry comprising configuration memory;
first control circuitry disposed between portions of the programmable logic circuitry; and
second control circuitry disposed outside the programmable logic circuitry, wherein the second control circuitry is configured to:
receive an access command from a portion of programmable logic circuitry;
determine a target node specified in the access command;
determine a target micro-network-on-chip column using the target node;
generate a message to cause a reading or writing of data associated with the target node, wherein the message comprises an identifier for a target micro-network-on-chip column comprising the target node; and
output the message to routing fabric configured to either pass or turn the message based on the identifier to route the message to the first control circuitry.

EXAMPLE EMBODIMENT 16. The system of example embodiment 15, wherein the first control circuitry is configured to read the data from at least some of the plurality of configuration memory of a microsector of the target node based at least in part by shifting of target data of the message through each 1-bit data register of the microsector at least once.

EXAMPLE EMBODIMENT 17. The system of example embodiment 15, wherein the first control circuitry is configured to write the data to at least some of the plurality of configuration memory of a microsector of the target node based at least in part by shifting of target data of the message through each 1-bit data register of the microsector no more than once.

EXAMPLE EMBODIMENT 18. The system of example embodiment 15, wherein the target node comprises a scan register used to perform verification operations.

EXAMPLE EMBODIMENT 19. The system of example embodiment 15, wherein the message comprises a header that is configured to indicate a command to be implemented by the target node.

EXAMPLE EMBODIMENT 20. The system of example embodiment 19, wherein a row controller of the target node is configured to receive the message and, after verifying that the header comprises a matching identifier to that of the row controller, generate a plurality of control signals to implement the command.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An integrated circuit, comprising:
a first network-on-chip disposed around at least a partial perimeter of a plurality of microsectors arranged in a row and column grid, wherein the plurality of microsectors comprises a first microsector communicatively coupled to a first row controller; and
a controller configured to transmit a command and first data from a second row controller to the first row controller using a second network-on-chip via a shared data path, down a column of rows, wherein the first row controller is configured to determine that the command matches at least a portion of an identifier associated with the first row controller, shift the command and the first data from the shared data path to stop transmission of the command and the first data via the shared data path, and perform an operation in response to the command using the first data and is configured to return second data to the controller using the second network-on-chip when the operation causes generation of the second data.

2. The integrated circuit of claim 1, wherein the plurality of microsectors comprises a second microsector disposed at a different position within the row and column grid than the first microsector, and wherein the first row controller is configured to program the first microsector at least partially in parallel with the second row controller programming the second microsector.

3. The integrated circuit of claim 1, wherein the second network-on-chip comprises a data path characterized by a same data width as a routing block of the controller.

4. The integrated circuit of claim 1, comprising a third row controller disposed below the first row controller, wherein the third row controller and the first row controller are coupled to the shared data path, and wherein the first row controller is configured to access the command transmitted via the shared data path before the second row controller is permitted to access the command.

5. The integrated circuit of claim 1, wherein a streaming data packet comprises the command and the first data, and wherein the streaming data packet comprises the command as part of a header.

6. The integrated circuit of claim 5, wherein the header comprises an indication of the first row controller.

7. The integrated circuit of claim 1, wherein the first microsector comprises a plurality of logic access blocks each coupled to a data register.

8. The integrated circuit of claim 7, wherein the data register comprises a 1-bit wide data path, a first flip-flop, and a second flip-flop, and wherein the 1-bit wide data path couples between the first flip-flop and the second flip-flop.

9. A method, comprising:
receiving, by a controller, an access command from a portion of programmable logic circuitry;
determining, by the controller, a target node specified in the access command;
determining, by the controller, a target micro-network-on-chip column using the target node;
generating, by the controller, a message to cause reading or writing data associated with the target node, wherein the message comprises a first identifier for the target micro-network-on-chip column comprising the target node; and
outputting, by the controller, the message to a column of rows comprising a plurality of row controllers of a routing fabric, wherein the plurality of row controllers are coupled via a shared data path, wherein each row controller of the plurality of row controllers is configured to either pass the message down the column of rows via the shared data path or stop transmission of the message based on the first identifier, wherein a first row controller of the plurality of row controllers is coupled to the target micro-network-on-chip column, wherein the first row controller is configured to stop transmission of the message via the shared data path based on determining that the access command matches at least a portion of the first identifier associated with the first row controller, and read the data from or write the data to the target node using the target micro-network-on-chip column based on the message.

10. The method of claim 9, comprising:
determining, by the controller, a parameter from the access command; and
determining, by the controller, the target node from the parameter.

11. The method of claim 9, comprising generating, by the controller, the message to comprise a second identifier for the target node, wherein each node between the target node and a first node of the target micro-network-on-chip column determines whether the second identifier of the message matches their own identifier.

12. The method of claim 10, comprising receiving, by the controller, the message from a routing network, wherein the message comprises requested data previously stored in the target node before the target node inserted the requested data into the message.

13. The method of claim 12, comprising receiving, by the controller, a toggled acknowledgement signal in response to the target node inserting the requested data into the message.

14. A system, comprising:
programmable logic circuitry comprising configuration memory;
a routing fabric comprising a plurality of row controllers disposed on a column of rows between portions of the programmable logic circuitry, wherein the plurality of row controllers are coupled via a shared data path, wherein each row controller of the plurality of row controllers is configured to either pass a message down the column of rows via the shared data path or stop transmission of the message based on at least a portion of the message matching an identifier of the respective row controller; and
control circuitry disposed outside the programmable logic circuitry, wherein the control circuitry is configured to:
receive an access command from a portion of programmable logic circuitry;
determine a target node specified in the access command;
determine a target micro-network-on-chip column using the target node;
generate a message to cause a reading or writing of data associated with the target node, wherein the message comprises an identifier for the target micro-network-on-chip column comprising the target node; and
output the message to the plurality of row controllers down the column of rows via the shared data path, wherein a first row controller of the plurality of row controllers is coupled to the target micro-network-on-chip column, wherein the first row controller is configured to stop transmission of the message via the shared data path based on determining that the access command matches at least a portion of the identifier associated with the first row controller, and read the data from or write the data to the target node using the target micro-network-on-chip column based on the message.

15. The system of claim 14, wherein the first row controller is configured to read the data from at least some of the configuration memory of a microsector of the target node based at least in part by shifting of target data of the message through each 1-bit data register of the microsector at least once.

16. The system of claim 14, wherein the first row controller is configured to write the data to at least some of the configuration memory of a microsector of the target node based at least in part by shifting of target data of the message through each 1-bit data register of the microsector no more than once.

17. The system of claim 14, wherein the target node comprises a scan register used to perform verification operations.

18. The system of claim 14, wherein the message comprises a header that is configured to indicate a command to be implemented by the target node.

19. The system of claim 18, wherein the first row controller of the target node is configured to receive the message and, after verifying that the header comprises a matching identifier to that of the first row controller, generate a plurality of control signals to implement the command.

* * * * *